United States Patent
Chou et al.

(10) Patent No.: US 7,321,400 B1
(45) Date of Patent: Jan. 22, 2008

(54) METHOD AND APPARATUS FOR ADAPTIVE IMAGE DATA INTERPOLATION

(75) Inventors: Chih-Hsien Chou, San Jose, CA (US); Chang-Hau Lee, Fremont, CA (US)

(73) Assignee: Kolorific, Inc., Milpitas, CA (US)

( * ) Notice: Subject to any disclaimer, the term of this patent is extended or adjusted under 35 U.S.C. 154(b) by 576 days.

(21) Appl. No.: 11/063,484

(22) Filed: Feb. 22, 2005

(51) Int. Cl.
*H04N 5/21* (2006.01)
*H04N 7/01* (2006.01)

(52) U.S. Cl. .................. 348/616; 348/448; 348/452

(58) Field of Classification Search ............. 348/441, 348/607, 616, 617, 624, 448, 450–452, 458; *H04N 7/01, H04N 11/20, 5/21*
See application file for complete search history.

(56) References Cited

U.S. PATENT DOCUMENTS

| | | | |
|---|---|---|---|
| 6,058,248 A | 5/2000 | Atkins et al. ............... 358/1.2 |
| 6,122,017 A * | 9/2000 | Taubman .................... 348/620 |
| 6,133,957 A | 10/2000 | Campbell .................... 345/458 |
| 6,219,464 B1 | 4/2001 | Greggain et al. ........... 382/298 |
| 6,580,463 B2 | 6/2003 | Swartz ....................... 348/558 |
| 7,057,664 B2 * | 6/2006 | Law et al. .................. 348/448 |

\* cited by examiner

*Primary Examiner*—Sherrie Hsia
(74) *Attorney, Agent, or Firm*—Pinnacle Patent Law Group

(57) ABSTRACT

A method for determining a value for a missing target pixel in an image frame includes generating a classification index from a plurality of classification pixels in a classification window associated with the missing target pixel where the classification index indicates whether a recognizable pattern is detected in the classification window, using the classification index to select a filter index via a lookup table associated with the classification index, using the selected filter index to select a set of filter coefficients via a lookup table associated with the filter index, and calculating the value for the missing target pixel using the selected set of filter coefficients.

24 Claims, 18 Drawing Sheets

○ Available pixel (102)
× Missing pixel (104)
⊗ Missing Target Pixel (110)

○ Classification pixel (402)

⊗ Missing Target pixel (110)

⊘ Interpolation Pixel (403)

⊘ Interpolation Pixel (403)

— — First Window (800a)   ⊗ Missing Target Pixel (110)

– – – Second Window (800b)   ◉ Classification Pixel (802)

-----  Third Window (800c)

FIG. 8B

Narrow Interpolation Window (850a)

⊘ Interpolation Pixel 803

FIG. 8C

Wide Interpolation Window (850b)

⊘ Interpolation Pixel 803

FIG. 8D

Ring Interpolation Window (850c)

⊗ Interpolation Pixel 803

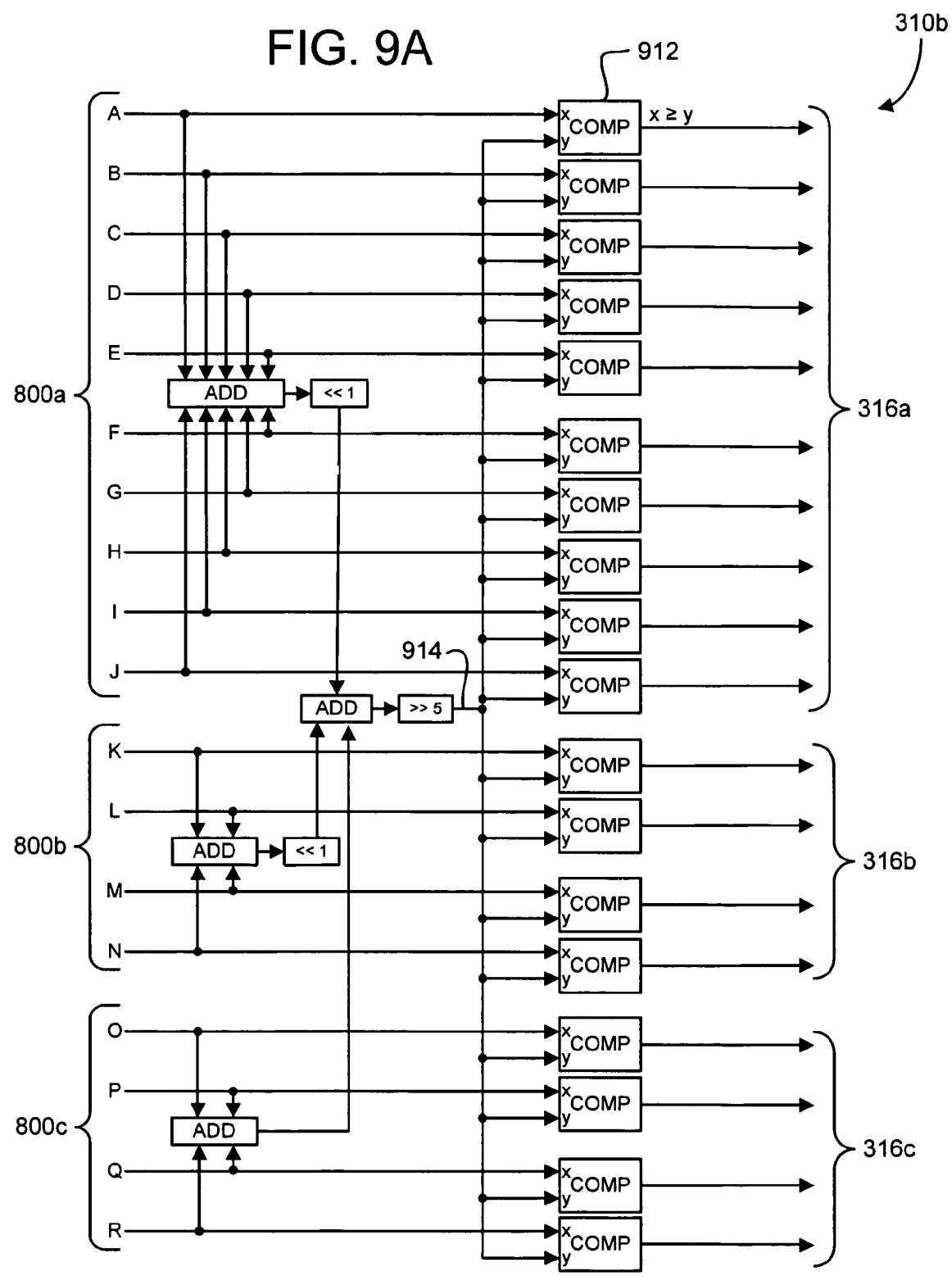

METHOD AND APPARATUS FOR ADAPTIVE IMAGE DATA INTERPOLATION

FIELD OF THE INVENTION

The present invention relates to data interpolation and more particularly to a method and apparatus for adaptively generating a value for a missing target pixel in an image frame.

BACKGROUND OF THE INVENTION

An image can be represented by a two-dimensional array of pixels. Each row of pixels is referred to as a scan line. The value assigned to each pixel determines its intensity and/or color when the image is recreated. The resolution of the image is represented by the size of the two-dimensional array, i.e., the number of pixels. The greater the number of pixels, the higher the resolution and vice versa. A low-resolution, i.e., standard definition (SD), image can be enhanced to become a high-resolution, i.e., high definition (HD), image, by increasing the number of scan lines, which in turn increases the number of pixels. The pixels in the additional scan lines are referred to as "missing" pixels because their values must be determined from something other than the live source that was captured in the original image.

The simplest ways to generate values for missing pixels is by line repetition, i.e., repeating a scan line, or line averaging, i.e., averaging the two vertically adjacent scan lines. These techniques increase the number of scan lines and is adequate if the image is relatively smooth with no high spatial frequency components in the vertical direction. Nevertheless, if the image has fine details in the vertical direction and/or the image has sharp diagonal edges, the enhanced image will exhibit annoying and undesirable visual artifacts such as, for example, blur in the fine details and aliasing along the diagonal edges. The aliasing causes the diagonal edge to appear "jaggy," hence the reference to "jaggy edges."

Alternatively, a missing pixel value can be generated by analyzing available pixel values of pixels surrounding the missing pixel and performing complex calculations to generate an interpolated value for the missing pixel. This process, while effective in generating an enhanced image with significantly no visual artifacts, typically takes a long time and requires a high level of processing power. For instance, the analysis and computation usually takes several seconds and is performed by a central processing unit (CPU). Generally, this process can be feasible for printers or scanners. Nevertheless, for a system that requires a shorter conversion time, i.e., fractions of a second, and that does not typically use a CPU, this technique is not feasible. For example, this technique would not be feasible for a television display system that has a display frame rate typically in the range of about 60 (or more) frames per second and typically uses an application-specific integrated circuit (ASIC).

A less calculation intensive and faster technique for generating a pixel value for a missing pixel includes calculating a weighted sum of available pixel values surrounding the missing pixel and using a set of interpolation filter coefficients. Nevertheless, if the missing pixel value is interpolated using a non-adaptive interpolation filter, such as a bilinear filter, a quadratic filter, a cubic filter, a sinc filter, or other similar filters, it can be difficult to obtain a HD output image because the input SD image does not have high-frequency components that an output HD image should have. Accordingly, for these non-adaptive filtering methods, the annoying visual artifacts mentioned above can be present in the enhanced image.

The missing high-frequency components can be restored by using a linear combination of the SD image and one of a plurality of adaptive interpolation filter coefficient sets. Each set of adaptive interpolation filter coefficients can be pre-determined and associated with a particular interpolation direction. The value for the missing pixel can be generated by selecting one of a plurality of pre-determined interpolation directions and then using the associated set of interpolation filter coefficients to execute the interpolation. This approach, however, may fail to reduce aliasing along a diagonal edge when the diagonal edge is along a direction that is not close to any one of the pre-determined interpolation directions or when multiple dominant edge directions are present close to the missing pixel. In these instances, the interpolated value for each missing pixel along the diagonal edge can be wrong, and the resulting enhanced image can exhibit unusual and annoying visual artifacts such as those mentioned above.

In another approach, the missing high-frequency components can be restored by classifying the pixels surrounding the missing pixel and using the classification to select one or more sets of interpolation filter coefficients from a look-up table to execute the interpolation. While effective in producing an enhanced image with little or no visual artifacts, this approach requires high processing power to perform the complex computations to determine the classification and to perform the interpolation process, and also requires large amounts of memory for storing the large look-up tables corresponding to the pre-determined sets of interpolation filter coefficients. Such processing power and memory requirements are expensive. In addition, the time required to perform the interpolation for each missing pixel in a frame is generally too long for certain display systems, such as televisions.

Accordingly there exists a need for an improved adaptive image data interpolation process that generates an enhanced, i.e., HD, image from an SD image. The enhanced image should be substantially free of annoying visual artifacts, such as jaggy edges, and the process should not require excessive memory or computational resources.

SUMMARY

In one version, a method for determining a value for a missing target pixel in an image frame includes generating a classification index from classification pixels in a classification window associated with the missing target pixel. The classification index indicates whether a recognizable pattern is detected in the classification window and is used to select a filter index via a lookup table associated with the classification index. The filter index is then used to select a set of filter coefficients via a lookup table associated with the filter index. The value for the missing target pixel is calculated using the selected set of filter coefficients.

In another version, a pixel interpolation module determining a value for a missing target pixel in an image frame includes a means for receiving and buffering pixel data associated with pixels in a plurality of scan lines in the image frame, and a means for generating a classification index from a plurality of classification pixels in a classification window associated with the missing target pixel. The module also includes a filter index selection unit that includes at least one filter index lookup table for selecting a filter index associated with the classification index, and a filter coefficient selection unit that includes at least one filter coefficient lookup table for selecting a set of filter coefficients associated with the filter index. A pixel value calculation unit calculates the value for the missing target pixel using the selected set of filter coefficients.

In another version, the pixel interpolation module is integrated in a de-interlacing unit that converts interlaced video fields into a progressive video signal, and in another version, a progressive scan display system includes a de-interlacing unit that utilizes the pixel interpolation module described above.

DRAWINGS

These features, aspects and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

FIG. 8B, FIG. 8C and FIG. 8D are views of narrow, wide and ring interpolation windows, respectively, associated with the classification window depicted in FIG. 8A;

FIG. 9A is an exemplary logic diagram of the classification index unit according to another version of the present invention;

Figure 13:
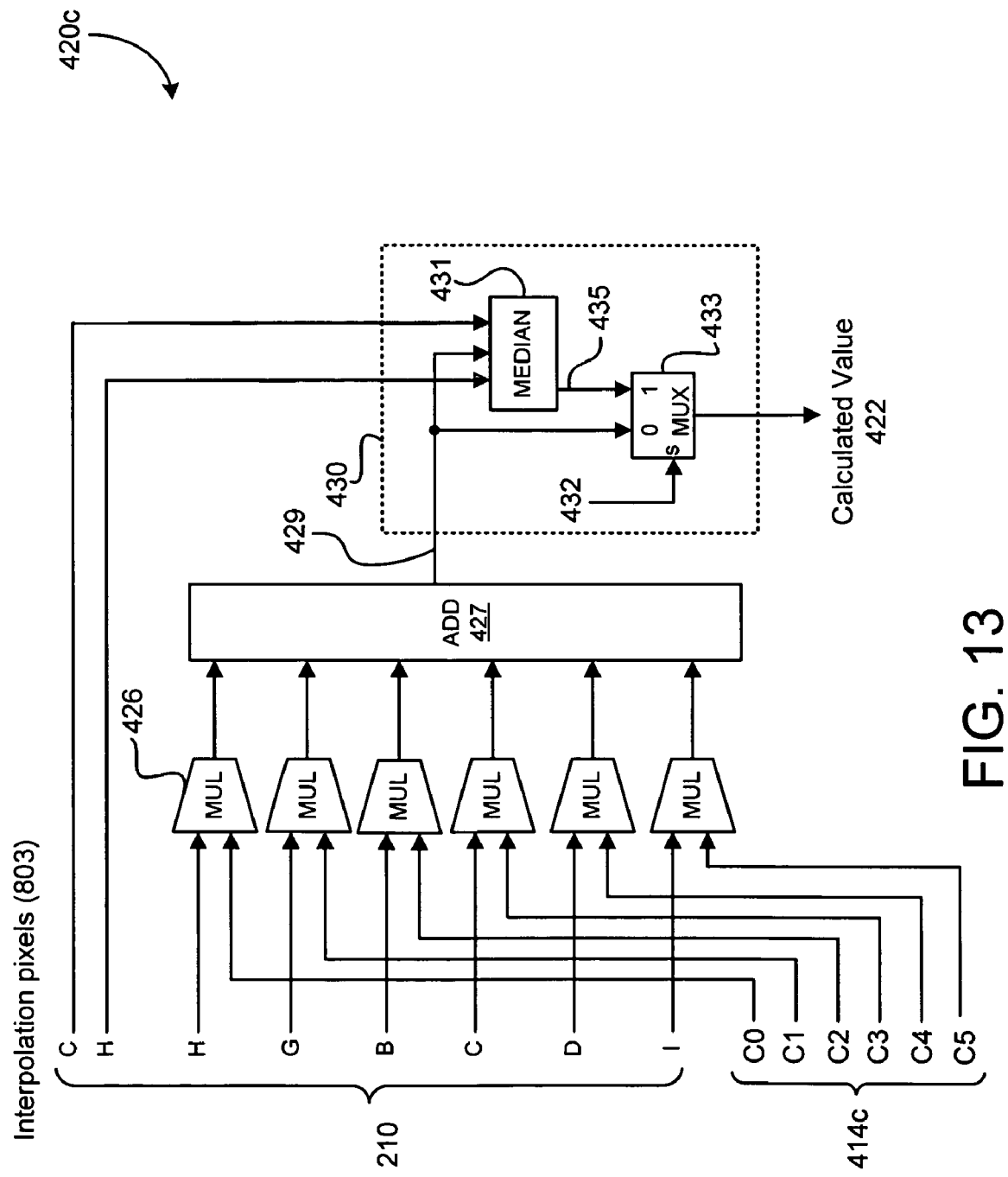
Figure 14:
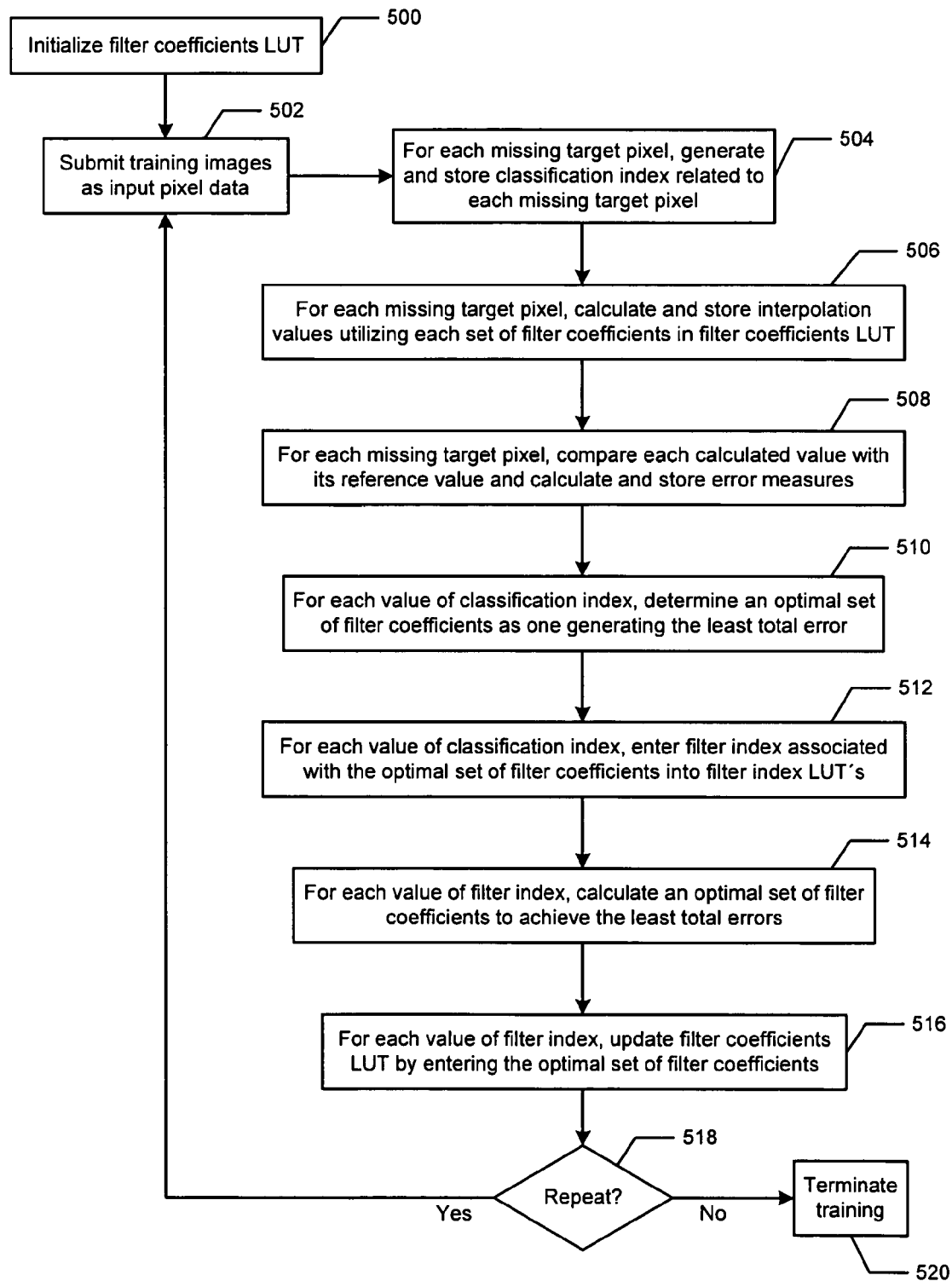
Figure 15:
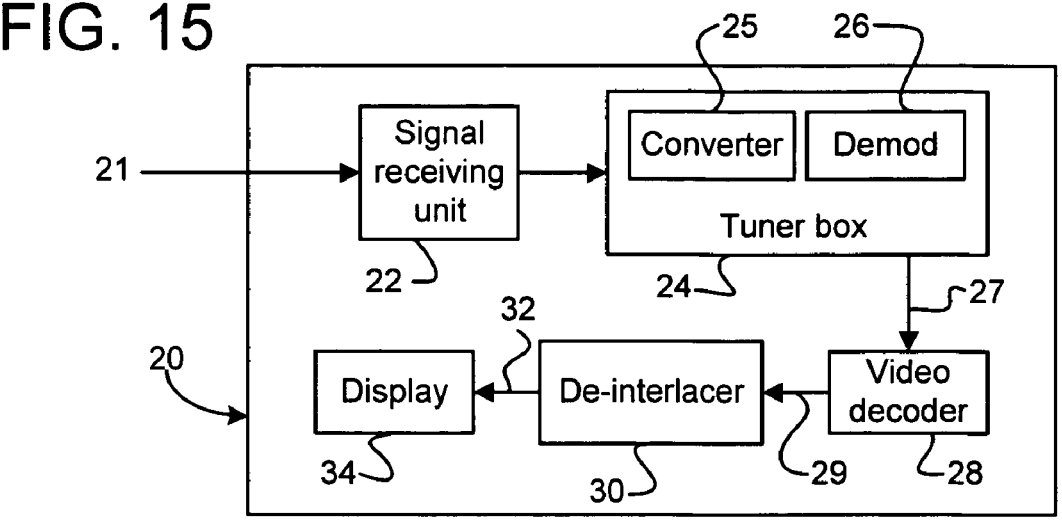
Figure 16:
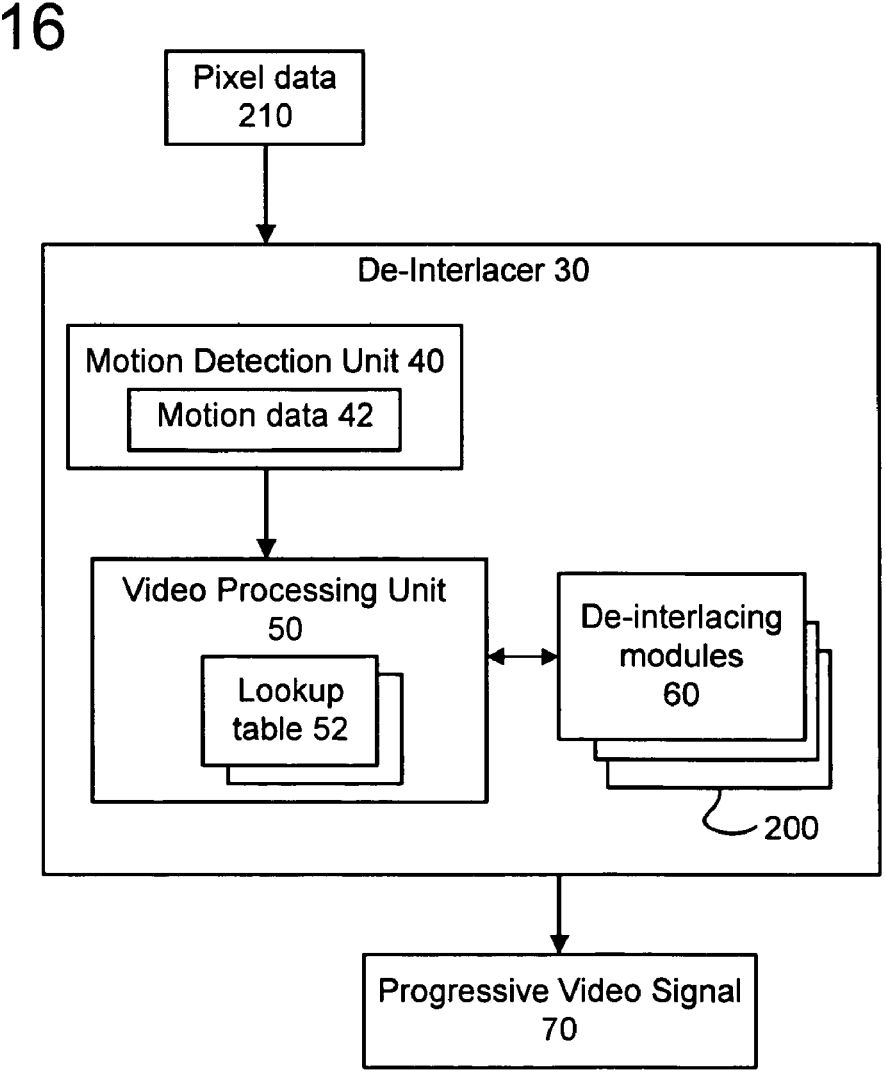

FIG. 13 an exemplary logic diagram of the pixel value calculation unit according to another version of the present invention;

FIG. 14 is a flowchart illustrating a training process for determining values in the LUT's according to a version of the present invention;

FIG. 15 is a block diagram of a display system according to a version of the present invention; and FIG. 16 is a schematic block diagram of a de-interlacer that uses the pixel interpolation module according to a version of the present invention.

DESCRIPTION

A method and apparatus are provided for adaptively generating an enhanced high definition output image from a standard definition input image. The enhanced image is a digitally interpolated image that is substantially without jaggy edges and other annoying visual artifacts. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is to be accorded the widest scope consistent with the principles and features described herein.

Figure 1:
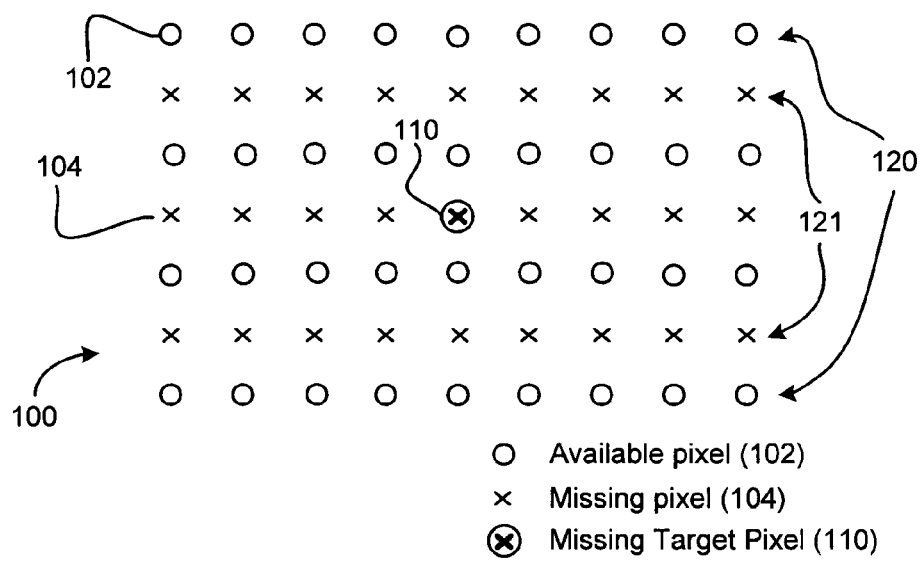
FIG. 1 is a view of an exemplary image frame.

FIG. 1 is a view of an exemplary image frame 100. The frame 100 includes a plurality of pixels 102 where each pixel 102 has a value or a set of values that determines its visual appearance. For example, the value can be from a monochrome video signal or the luminance component of a component color video signal, or the set of values can be from the luminance and chrominance components of a component color video signal. The pixels 102 are arranged in rows and columns. The rows are referred to as scan lines 120. When the image frame 100 is displayed by a display system, such as a television, each scan line 120 is sequentially transmitted as a video signal and displayed.

The resolution of the simplified image frame 100 illustrated in FIG. 1 is 4 (rows)×9(columns) pixels 102. Typically, the resolution is much larger, for example 480×640 and 480×704 with interlaced or progressive scanning for SD, 720×1280 with progressive scanning for HD, and 1080×1920 with interlaced or progressive scanning for HD. New scan lines 121 can be inserted between the existing scan lines 120 to increase the resolution. The new scan lines 121 have missing pixels 104 for which values will be generated by a pixel interpolation module according to a version of the present invention.

Figure 2:
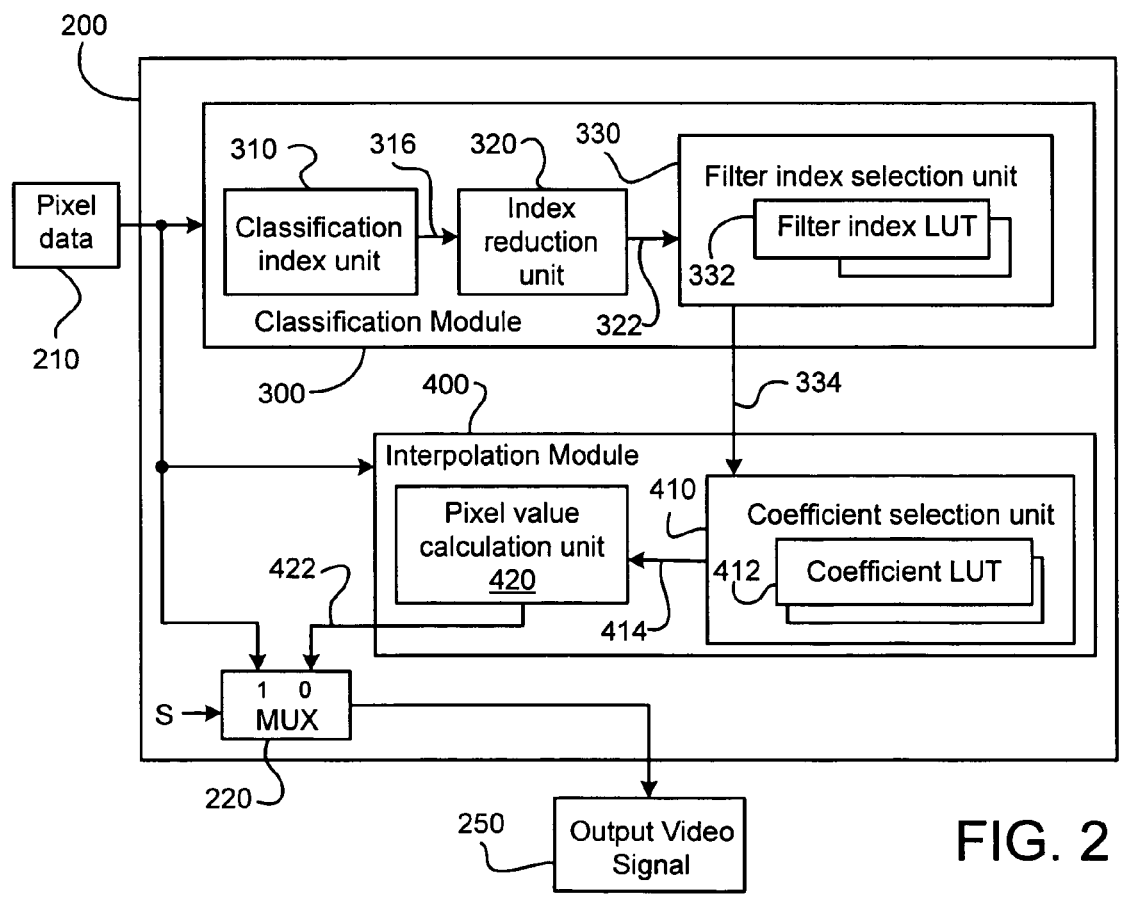
FIG. 2 is a schematic block diagram of a pixel interpolation module according to a version of the present invention.

FIG. 2 is a schematic block diagram of the pixel interpolation module according to an embodiment of the present invention. The pixel interpolation module 200 includes a classification module 300 and an interpolation module 400. The classification module 300 includes a classification index unit 310, an index reduction unit 320 and a filter index selection unit 330 comprising at least one look-up table 332. The interpolation module 400 includes a filter coefficient selection unit 410 comprising at least one look-up table 412 and a pixel value calculation unit 420. Each component will be described below with reference to FIG. 3A and FIG. 3B, which is a flowchart illustrating a process for enhancing an image frame according to a version of the present invention.

Figure 3A:
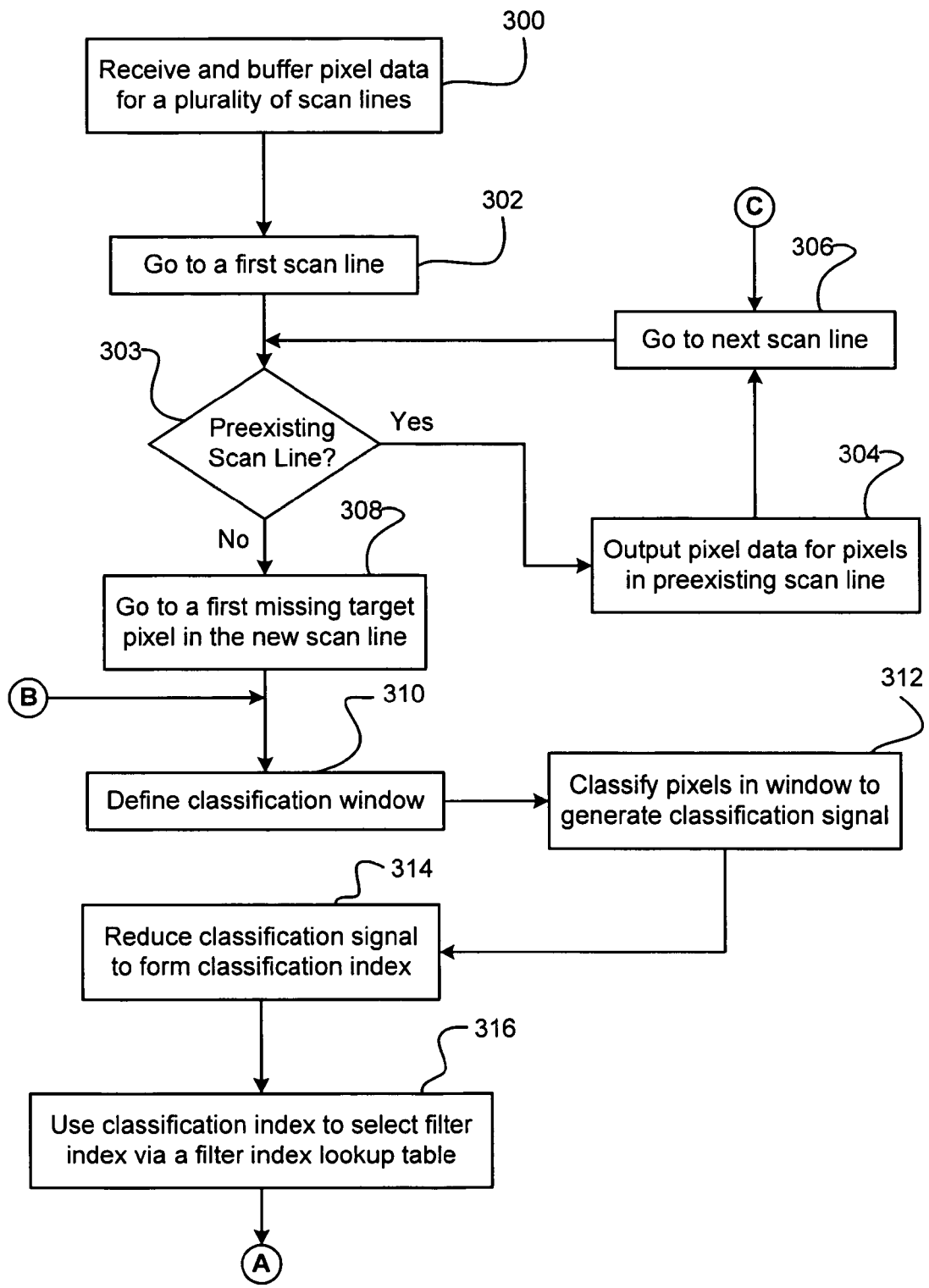
FIG. 3A and FIG. 3B is a flowchart illustrating a process for enhancing an image frame according to a version of the present invention.

Referring to FIG. 1, FIG. 2 and FIG. 3A, the process begins when the pixel interpolation module 200 receives and temporarily stores pixel data 210 for a plurality of scan lines 120 (step 300) in a buffer (not shown). The pixel interpolation module 200 then goes to a first subject scan line in an enhanced frame 100 (step 302). The subject scan line can be either a preexisting scan line 120, i.e., one having available pixels 102 and pixel data 210, or a new scan line 121. If the subject scan line is a preexisting scan line 120 (step 303), the pixel interpolation module 200 outputs the pixel data 210 for the pixels 102 in the preexisting scan line 120 (step 304) and then goes to the next subject scan line (step 306).

If the subject scan line is a new scan line 121, values for the missing pixels 104 are generated by the pixel interpolation module 200. According to a preferred embodiment, the classification module 300 begins with a first missing target pixel 110 in the new subject scan line 121 (step 308). The classification module 300 defines at least one classification window by selecting a plurality of classification pixels surrounding the missing target pixel 110 (step 310). In one version, illustrated in FIG. 4A, a classification window 400 includes ten (10) classification pixels 402, i.e., pixels A-J, in a preceding and in a subsequent scan line 120a, 120b and directly above and below the missing target pixel 110. The classification window 400 depicted is but one example. In other versions, one or more classification windows can be used that include a smaller or larger number of classification pixels in different locations. For example, in another version illustrated in FIG. 8A, three classification windows 800a-800c are defined and eighteen (18) classification pixels 802 are used. Generally, increasing the number of classification pixels 402, 802, and in turn, the size or number of classification window(s) 400, 800a-800c, improves the performance of the pixel interpolation module 200 because the detection of horizontally shallow diagonal edges is improved.

Referring again to FIG. 3A, the classification module 300 classifies the classification pixels 402, 802 in each window 400, 800a-800c to generate a classification signal 316 (step 312). In one version, the classification index unit 310 in the classification module 300 extracts from the buffer (not shown) the pixel data 210 corresponding to each of the classification pixels 402, 802 and compares each pixel value to a weighted average of the classification pixels 402, 802. The classification signal 316 indicates whether the missing target pixel 110 is on or near a recognizable pattern, such as a sharp diagonal edge, and is also indicative of the direction of the diagonal edge if it exists. Other recognizable patterns can be a slope, a line, or a more complicated texture around the missing target pixel 110. In general, the classification signal 316 includes a bit for each attribute associated with the group of classification pixels 402, 802. While other methods for abstracting the attributes associated with the group of classification pixels 402, 802 are possible, in a preferred embodiment, the classification signal 316 includes a bit for each classification pixel. Thus, the number of bits in the classification signal 316 depends on the number of classification pixels 402, 802 in the classification window(s) 400, 800a-800c.

After the classification signal 316 has been generated (step 312), it is reduced by the index reduction unit 320 in the classification unit 300 (step 314). The index reduction unit 320 reduces the classification signal 316 by exploiting the symmetry of the classification pixels 402, 802 in the classification window(s) 400, 800a-800c. According to a preferred embodiment, the index reduction unit 320 reduces the classification signal 316 by one bit to form a classification index 322. The significance of this one bit reduction will become evident below.

The classification index 322, like the classification signal 316, indicates whether the missing target pixel 110 is on or near a recognizable pattern, such as a sharp diagonal edge, and is also indicative of the direction of the diagonal edge if it exists. The classification index 322 is used by the filter index selection unit 330 to select a filter index 334 (step 316). The filter index 334 is selected by performing a lookup on at least one filter index lookup table 332 and selecting the filter index 334 associated with the classification index 322. The number of entries in the filter index lookup table 332 is determined by the number of bits in the classification index 332, which in turn is determined by the number of classification pixels 402, 802 in the classification window(s) 400, 800a-800c. Thus, by reducing the number of bits in the classification signal 316 by one bit, the size of the filter index lookup table(s) 332 can be reduced significantly by one-half.

Figure 3B:
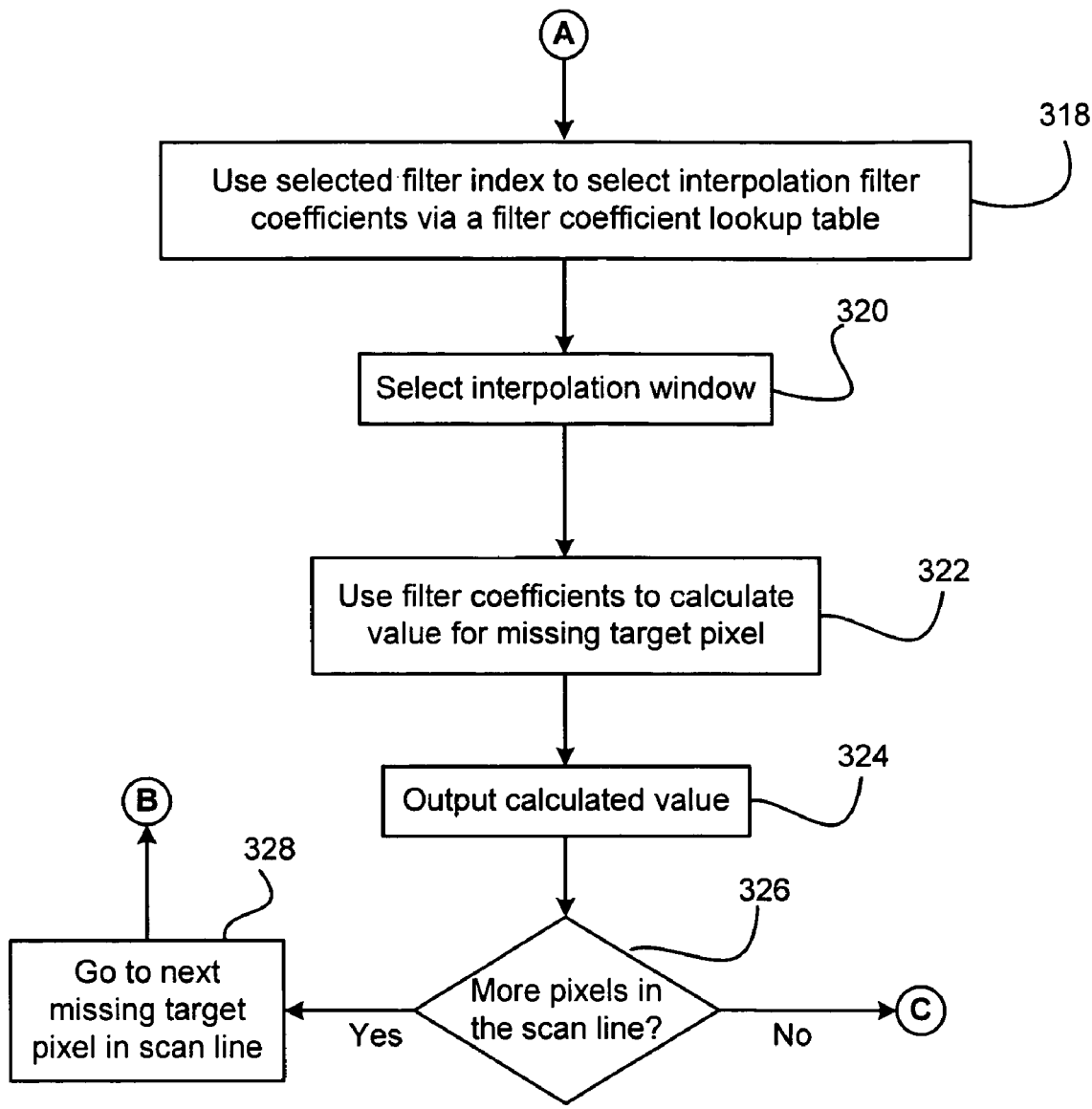

Referring now to FIG. 3B, the interpolation module 400 receives the selected filter index 334 from the classification module 300 and uses it to select a set from a plurality of sets of interpolation filter coefficients 414 (step 318). The set of interpolation filter coefficients 414 is selected by performing a lookup on a filter coefficient lookup table (LUT) 412 and selecting the set of filter coefficients 414 associated with the filter index 334. The filter coefficients in the set 414 are used along with the interpolation pixels 403, 803 to calculate the value for the missing target pixel 110.

Generally, the number of filter coefficients in a set 414 is equal to the number of interpolation pixels 403, 803 in the interpolation window 450. According to one version of the present invention, however, the number of filter coefficients can be significantly reduced if the interpolation pixels 403, 803 chosen are arranged symmetrically around the missing target pixel 110. Notably, every pixel 403, 803 on one side of the missing target pixel 110 has a companion pixel 403, 803 located the same distance from the missing target pixel 110 and 180 degrees away, such that vectors from the missing target pixel 110 to each companion pixel are equal in length and point in opposite directions. For example, referring to FIG. 4B, pixel A and pixel J are companions, as are pixel B and pixel 1, pixel C and pixel H, pixel D and pixel G, and pixel E and pixel F. Because of this symmetry, it can be assumed that companion pixels share the same interpolation filter coefficient. Because each filter coefficient can be associated with two interpolation pixels that are companions, the number of filter coefficients in a set 414 can be halved, thereby reducing the size of the filter coefficient LUT 412 and the associated hardware costs.

Moreover, the number of entries in the filter coefficient LUT 412, can be significantly reduced if each interpolation pixel 403, 803 chosen has a corresponding mirror image pixel 403, 803. For example, referring to FIG. 4B, pixels A and B are the mirror images of pixels E and D, respectively, and pixels F and G are the mirror images of pixels J and I, respectively. Pixels C and H are mirror images of themselves. Because of these symmetry properties, each filter coefficient set 414 has a corresponding mirror image filter coefficient set 414 where the filter coefficients in one set are the mirror image of those in the corresponding mirror image set. For example, referring to FIG. 4B, for a given filter coefficient set 414, the filter coefficient for pixel A can be C1, and the filter coefficient for pixel E can be C2, where pixel A and pixel E are mirror images of one another. In the corresponding mirror image coefficient set 414, the filter coefficient for pixel A and pixel E are C2 and C1, respectively. Accordingly, by recognizing that mirror image coefficient sets can be grouped together, the number of entries in the filter coefficient LUT 412 can be halved, thereby further reducing the size and associated hardware cost of the filter coefficient LUT 412.

Figure 4A:
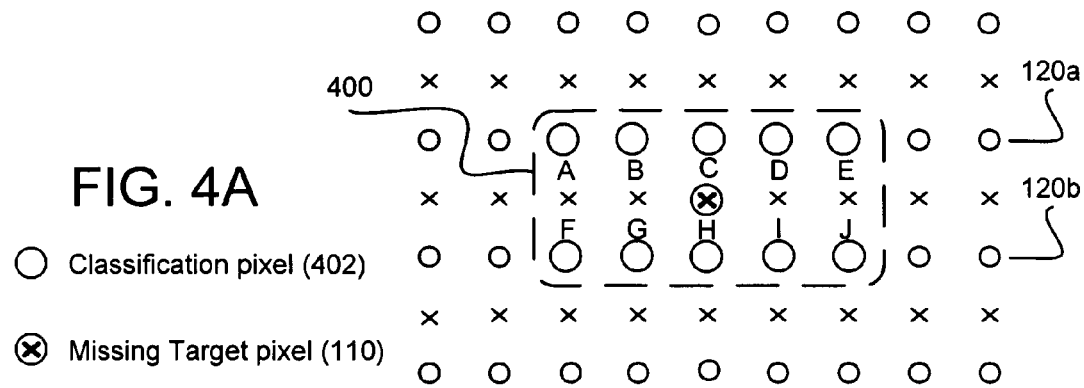
FIG. 4A is a view of a classification window according to a version of the present invention.
Figure 4B:
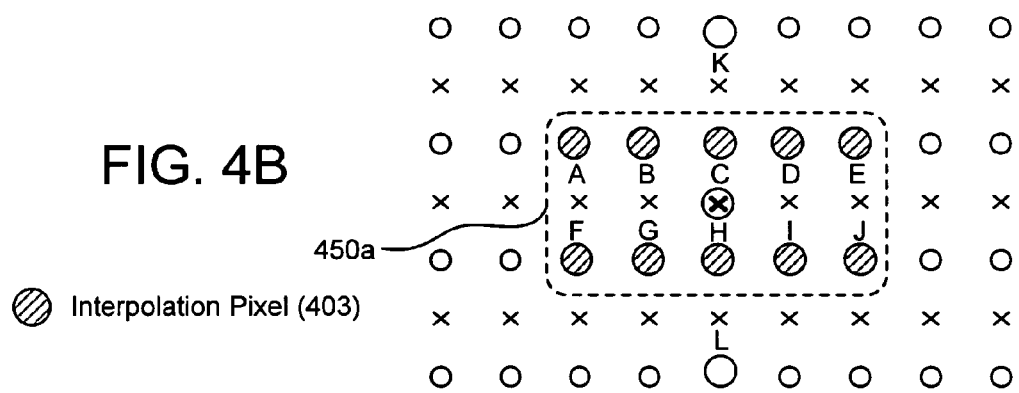
FIG. 4B and FIG. 4C are views of first and second interpolation windows, respectively, associated with the classification window depicted in FIG. 4A.
Figure 4C:
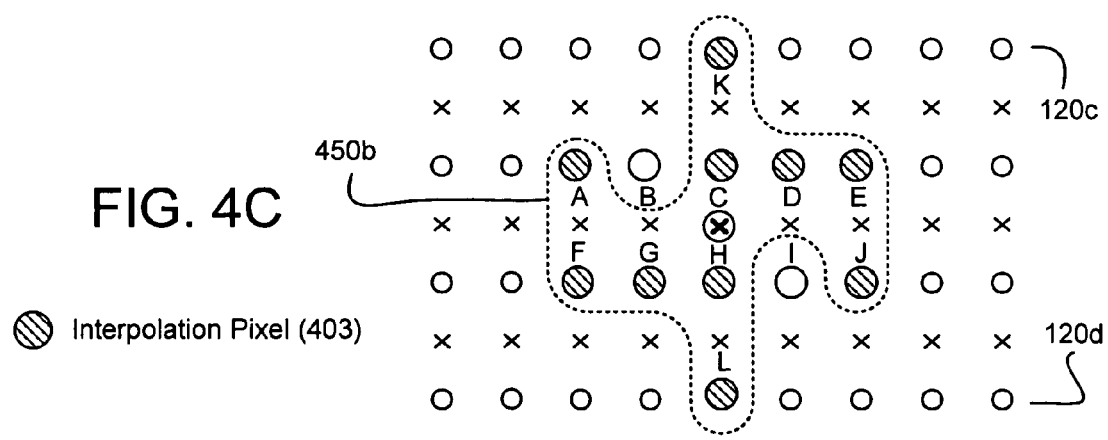
Figure 8A:
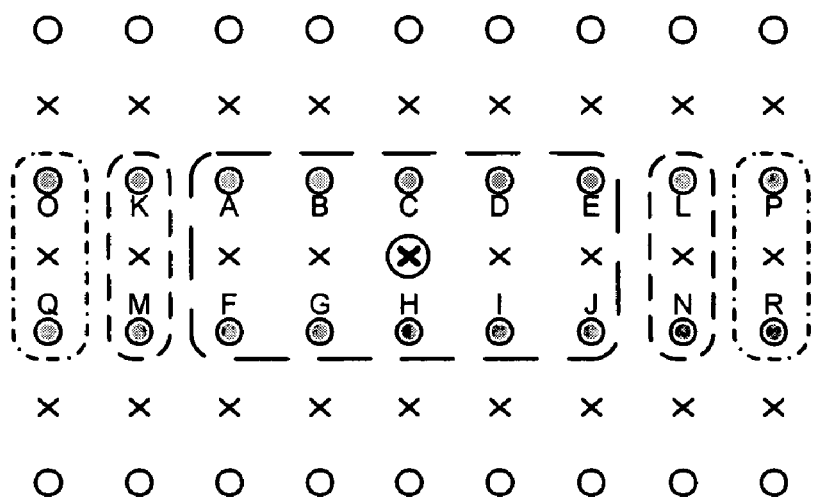
FIG. 8A is a view of a plurality of classification windows according to another version of the present invention.

Referring again to FIG. 3B, after the set 414 is selected, an interpolation window is chosen (step 320). The interpolation window comprises a plurality of interpolation pixels that can be used to calculate the value of the missing target pixel 110. According to one version, the interpolation window and pixels are selected depending on whether a recognizable pattern is detected near the missing target pixel 110 and in the classification window 400, 800a-800c. Examples of interpolation windows and interpolation pixels for the classification window 400 shown in FIG. 4A are illustrated in FIG. 4B and FIG. 4C, while interpolation windows and pixels for the classification windows in FIG. 8A are illustrated in FIG. 8B, FIG. 8C and FIG. 8D. The illustrated interpolation windows 450a, 450b, 850a-850c, are exemplary and other configurations are possible.

For example, referring to FIG. 4B, the interpolation pixels 403 in the interpolation window 450a are the same as those in the classification window 400, i.e., pixels A-J. This interpolation window 450a is selected when a recognizable pattern is detected near the missing target pixel 110 in the classification window 400. In FIG. 4C, the interpolation window 450b includes pixels 403 located vertically above and below the missing target pixel 110 in next adjacent scan lines 120c, 120d, respectively (pixels K and L). Pixels B and I are excluded. This interpolation window 450b is selected when a recognizable pattern is not detected near or around the missing target pixel 110, and the vertically adjacent interpolation pixels 403, K and L, are used to perform a vertical interpolation.

Referring again to FIG. 3B, once the interpolation window 450a, 450b, 850a-850c, is chosen, the filter coefficients in the set 414 are passed to the pixel value calculation unit 420, which uses the set of filter coefficients 414 and the interpolation pixels 403, 803 to calculate the value for the missing target pixel 110 (step 322). The pixel value calculation unit 420 then outputs the calculated value 422 (step 324).

Next, the interpolation module 200 determines if the scan line 121 includes another missing target pixel 110 (step 326). If there is another missing target pixel 110, the interpolation module 200 goes to the next missing target pixel 110 (step 328) and repeats steps 310 et seq. (circle "B" in FIG. 3A). If values have been generated for each of the missing target pixels 110 in a scan line 121 (step 326), the interpolation module goes to the next scan line (step 306, FIG. 3A) and repeats steps 303 et seq. The resolution enhancement process is completed when all missing target pixels 110 in the frame 100 are assigned a calculated value 422 and outputted interlaced amongst the known pixels 102.

To describe further the preferred implementations of the present invention, the pixel interpolation module 200 will now be described in the context of several versions. Each version corresponds to a variation of the classification window 400, 800a-800c and interpolation window 450a, 450b, 850a-850c.

Figure 5:
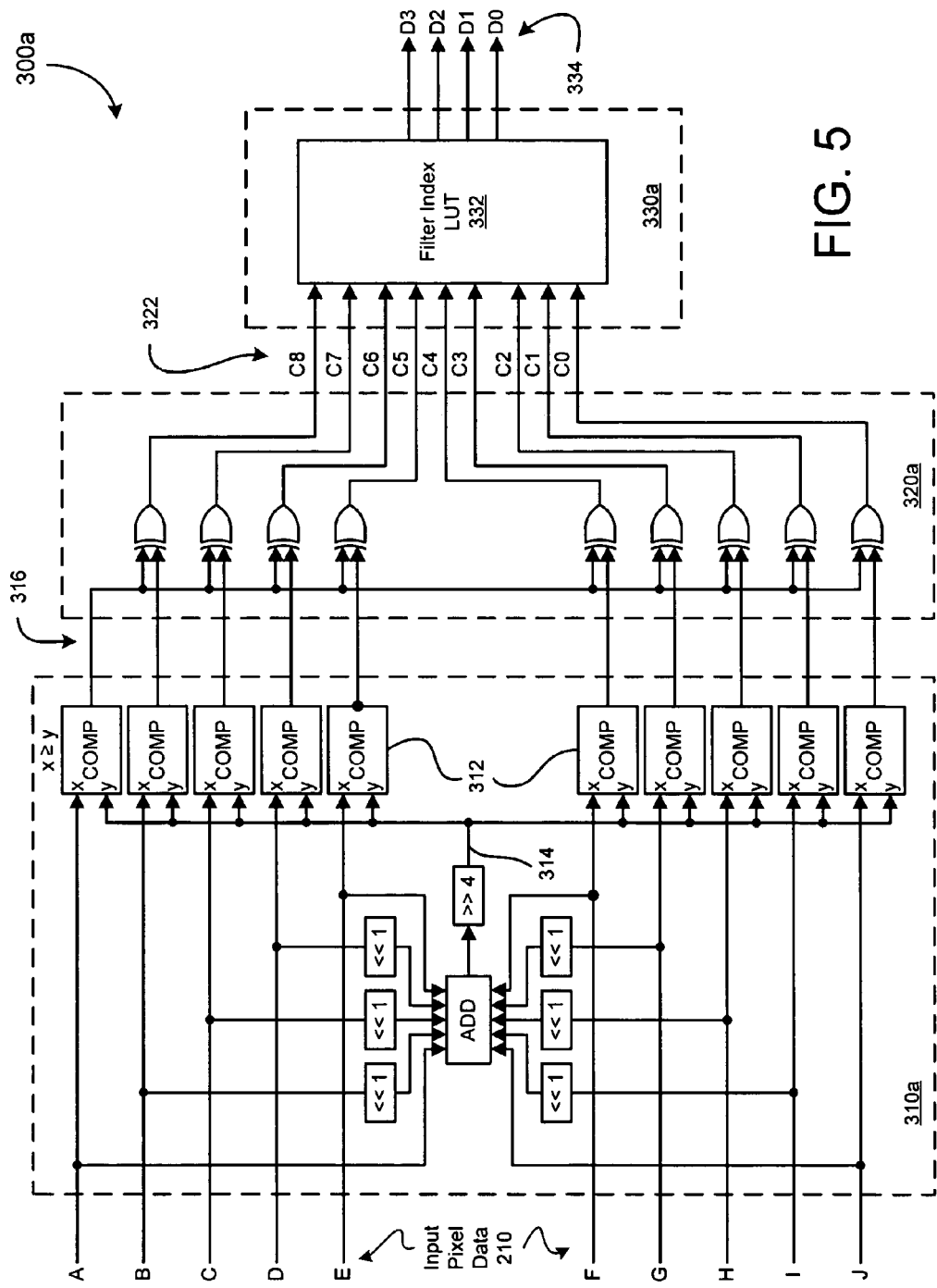
FIG. 5 is an exemplary logic diagram of a classification module according to a version of the present invention.

In one version of the present invention, the classification window 400 can be that illustrated in FIG. 4A. As is shown, the classification window 400 includes ten (10) classification pixels 402, i.e., pixels A-J, in a preceding and in a subsequent scan line 120a, 120b and directly above and below the missing target pixel 110. FIG. 5 is an exemplary logic diagram of a classification module 300a according to this version, where the "Y" component (i.e., luminance value) of the pixel data 210 for each classification pixel 402 in the classification window 400 is inputted into the classification index unit 310a and compared by a comparator 312 to the weighted average 314 of the classification pixels 402. As is shown, the more remote pixels 402, e.g., pixels A, J, E and F, are weighted less heavily than those pixels that are closer to the missing target pixel 110 (e.g., pixels B, C, D, G, H, and I). The result of the comparison is the classification signal 316. The classification signal 316 in this version is a ten (10)-bit value, one bit for each of the classification pixels 402 in the classification window 400.

The classification signal 316 is received by the index reduction unit 320a. The classification signal 316 is reduced from a ten (10)-bit value to a nine (9)-bit value by "XOR'ing" the result of the comparison between pixel A and the weighted average 314 with each of the other bits of the classification signal 316. The result is a nine (9)-bit classification index 322.

The classification index 322 is received by the filter index selection unit 330a, which includes a filter index lookup table 332. As stated above, the number of entries in the filter index lookup table 332 is determined by the number of bits in the classification index 332. Accordingly, in the version shown in FIG. 5, the filter index lookup table 332 includes 512 entries corresponding to the nine (9)-bit classification index 322. Thus, by reducing the number of bits in the classification signal 316 by one bit, the size of the filter index lookup table(s) 332 is reduced significantly from 1024 entries to 512 entries. The corresponding filter index 334 is selected based on the classification index 322, and passed to the coefficient selection unit 410 in the interpolation module 400.

Figure 6:
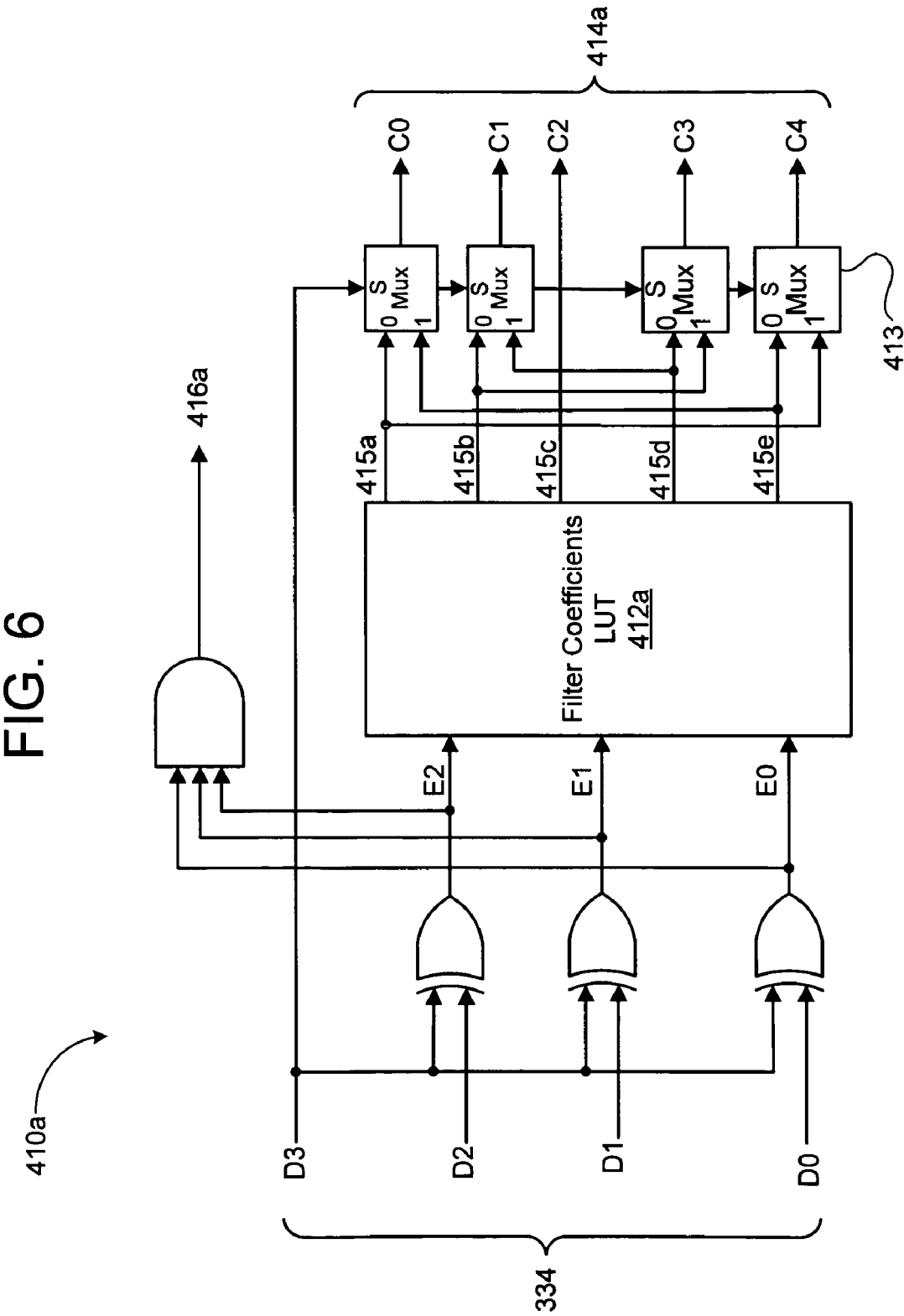
FIG. 6 is an exemplary logic diagram of the coefficient selection unit according to a version of the present invention.

FIG. 6 is an exemplary logic diagram of the coefficient selection unit 410a in the interpolation module 400 that receives the filter index 334 from the classification unit 300a illustrated in FIG. 5 according to this version of the present invention. As stated above, the classification index 334 is used to perform a lookup on a filter coefficient LUT 412a to select a set of interpolation filter coefficients, C0-C4 (414a). The number of bits of the filter index 334 is set by the number of interpolation filter coefficient sets 414. In this version, 16 sets of filter coefficients 414 are used, and therefore, the filter index 334, D0-D3, includes four (4) bits. If a greater number of filter coefficient sets 414 are used, the number of bits representing the filter index 334 will also increase. Note that while a greater number of filter coefficient sets 414 can improve the quality of the pixel interpolation, it can also increase the size of the filter coefficient lookup table 412 and therefore the associated hardware costs.

The 16 filter coefficient sets are reduced to eight (8) sets 414 because of the symmetry properties of the interpolation window 450a, 450b. Accordingly, the filter coefficient LUT 412a includes eight (8) entries corresponding to the eight (8) non-mirror image filter coefficient sets 414. Each of the eight entries includes five (5) filter coefficients 415a-415e, one for each interpolation pixel 403 and its companion pixel. As is shown, a first filter coefficient 415a corresponding to an interpolation pixel 403, e.g., pixel A, and a second filter coefficient 415e corresponding to its mirror image pixel 403, e.g., pixel E, are inputs into a multiplexer 413. Similarly, all but the filter coefficient 415c corresponding to companion pixels C and H are paired with their respective mirror image filter coefficients and inputted into a multiplexer 413. By using multiplexers 413 in this manner, the filter coefficients 415a-415e can be switched between pixels 403 that are mirror images, and therefore, the 16 sets of filter coefficients can be represented by the eight (8) entries in the LUT 412a.

As stated above, the filter index 334 determines which of the 16 sets 414 of filter coefficients is selected. The filter index 334 includes a mirror image bit, e.g., D3, and three filter index bits, D0-D2. The filter index bits, D0-D2, are "XOR'ed" with the mirror image bit, D3, and the resultant filter index bits, E0-E2, are inputted into the filter coefficient LUT 412. The filter coefficient set 414 corresponding to the resultant filter index bits, E0-E2, is selected from the LUT 412a, and each filter coefficient 415a-415e, except 415c, and its mirror image is inputted into the multiplexer 413. The mirror image bit, D3, is inputted into each multiplexer 413 and determines which inputted filter coefficient, e.g., 415a, 415e, is outputted from the multiplexer 413. The filter coefficients, C0-C4, in the selected set (414a) are passed to the pixel value calculation unit 420, where they are used to calculate the value for the missing target pixel 110.

In this version, the filter index 334 also determines which interpolation window 450a (FIG. 4B), 450b (FIG. 4C) is chosen. In particular, the resultant filter index bits, E0-E2, are "AND'ed" to generate an interpolation window bit 416a. The interpolation window bit 416a is passed to the pixel value calculation unit 420 and determines which interpolation window 450a, 450b and pixels 403 are chosen to calculate the value for the missing target pixel 110.

Figure 7:
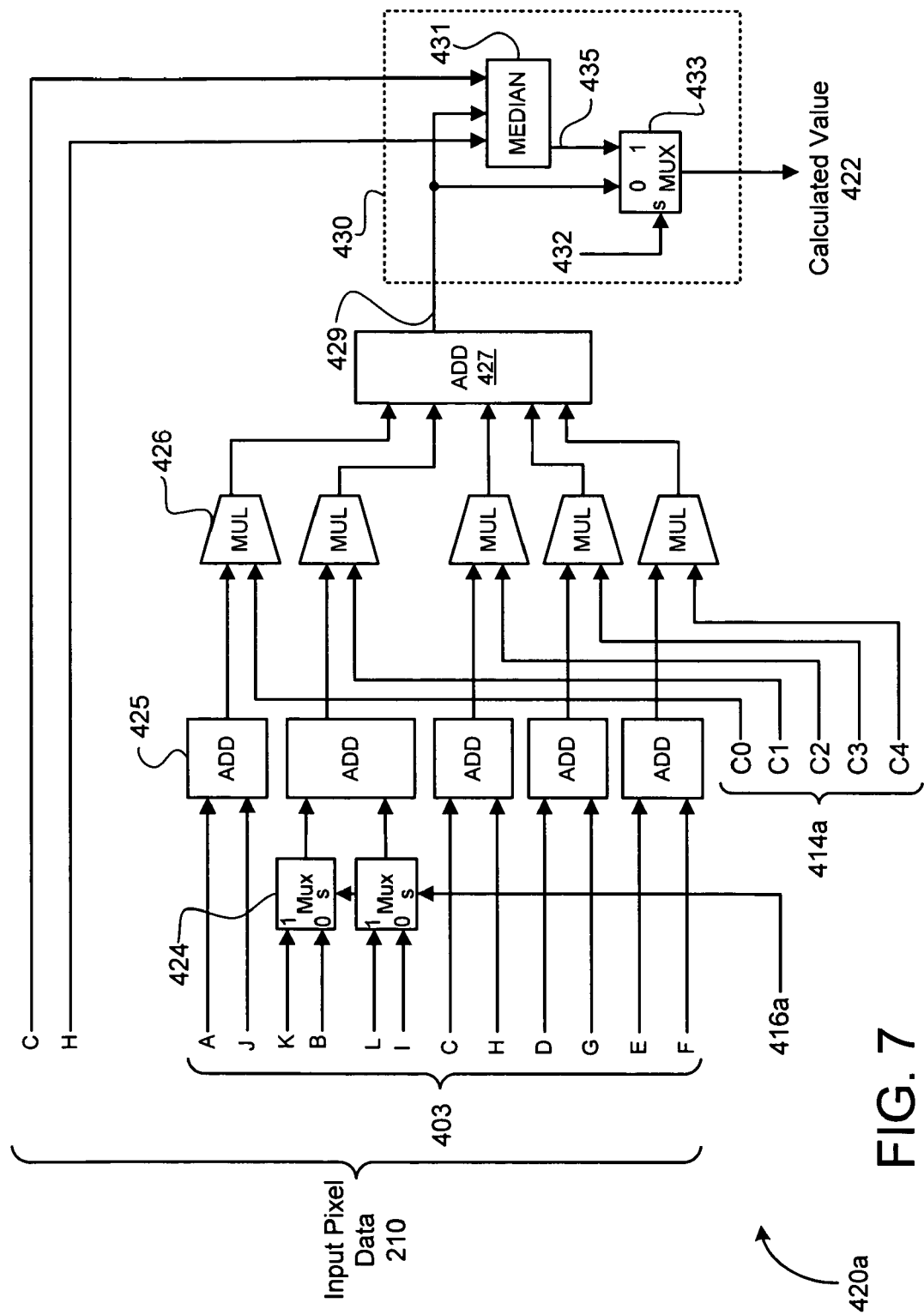
FIG. 7 is an exemplary logic diagram of the pixel value calculation unit according to a version of the present invention.

FIG. 7 is an exemplary logic diagram of the pixel value calculation unit 420a that receives the set of filter coefficients 414a and the interpolation window bit 416a from the filter coefficient selection unit 410a illustrated in FIG. 6 according to a version of the present invention. The interpolation windows 450a, 450b used are those illustrated in FIG. 4B and FIG. 4C. In the version illustrated in FIG. 7, the pixel value calculation unit 420a receives the pixel data 210 associated with each of the interpolation pixels 403, i.e., pixels A-L. In an embodiment, the pixel data 210 comprises the "Y" signal (luminance value). In another embodiment, the pixel data 210 comprises the "Y" signal (luminance value) and the "Cb" and "Cr" signals (chrominance values). The interpolation window bit 416a is inputted as an address signal into at least one interpolation window multiplexer 424. In this version, if the interpolation window bit 416a has a bit value equal to one (1), the interpolation window multiplexer 424 outputs the pixel data 210 for pixels K and L and the interpolation window 450b is that depicted in FIG. 4C. Alternatively, if the interpolation window bit 416a is equal to zero (0), the pixel data 210 for pixels B and I are outputted and the interpolation window 450a is that depicted in FIG. 4B.

The pixel data 210 for each pair of companion interpolation pixels 403 is added by an adder 425 and the result is multiplied by a multiplier 426 with the corresponding filter coefficient, C0-C4, in the set 414a. The results from each multiplier 426 are added by another adder 427 and the output is an interpolated value 429 for the missing target pixel 110. In one version, the interpolated value 429 is outputted directly from the pixel value calculation unit 420 as the calculated value 422. In another version, the interpolated value 429 is analyzed to ensure that it is not an anomaly. For example, if the classification window 400 includes an unusual edge, such as a curved diagonal edge or dull diagonal edge, the interpolated value 429 for the missing target pixel 110 can cause the pixel to appear grossly out-of-place in the enhanced frame.

To mitigate this problem, the interpolated value 429 is received by a median filter unit 430, which includes a median filter 431 and a multiplexer 433. The median filter 431 outputs a median value 435 between the interpolated value 429, and the values of the pixels vertically above, e.g., pixel C, and below, e.g., pixel H, the missing target pixel 110. The median value 435 is passed to the multiplexer 433 along with the interpolated value 429. A median enable bit 432, which may be preset or set by a user, determines whether the median value 435 or the interpolated value 429 is outputted as the calculated value 422.

Presumably, if the interpolated value 429 is not an anomaly, the median value 435 will be the interpolated value 429. Thus, regardless of whether the median filter unit 430 is enabled, the calculated value 422 will be the interpolated value 429. If, however, the interpolated value 429 is an anomaly, it is likely that the median value 435 will be different from the interpolated value 429. In this case, if the median filter unit 430 is enabled, the calculated value 422 outputted will be the median value 435 and the likelihood of generating a grossly out-of-place pixel is reduced.

In another version of the present invention, more than one classification window is defined in order to detect better certain recognizable patterns, such as a nearly horizontal diagonal edge. As is shown in FIG. 8A, three classification windows 800a-800c can be defined. A first window 800a comprises the ten (10) classification pixels 802 immediately surrounding the missing target pixel 110, i.e., pixels A-J. A second classification window 800b comprises four (4) classification pixels 802, i.e., pixels K-N, adjacent to the outermost pixels 802 of the first window 800a. A third classification window 800c comprises the four (4) classification pixels 802, i.e., pixels O-R, adjacent to the four (4) pixels in the second window 800b. Accordingly, each successive classification window 800a-800c defines a wider area in which to detect a nearly horizontal diagonal edge near the missing target pixel 110.

Figure 9B:
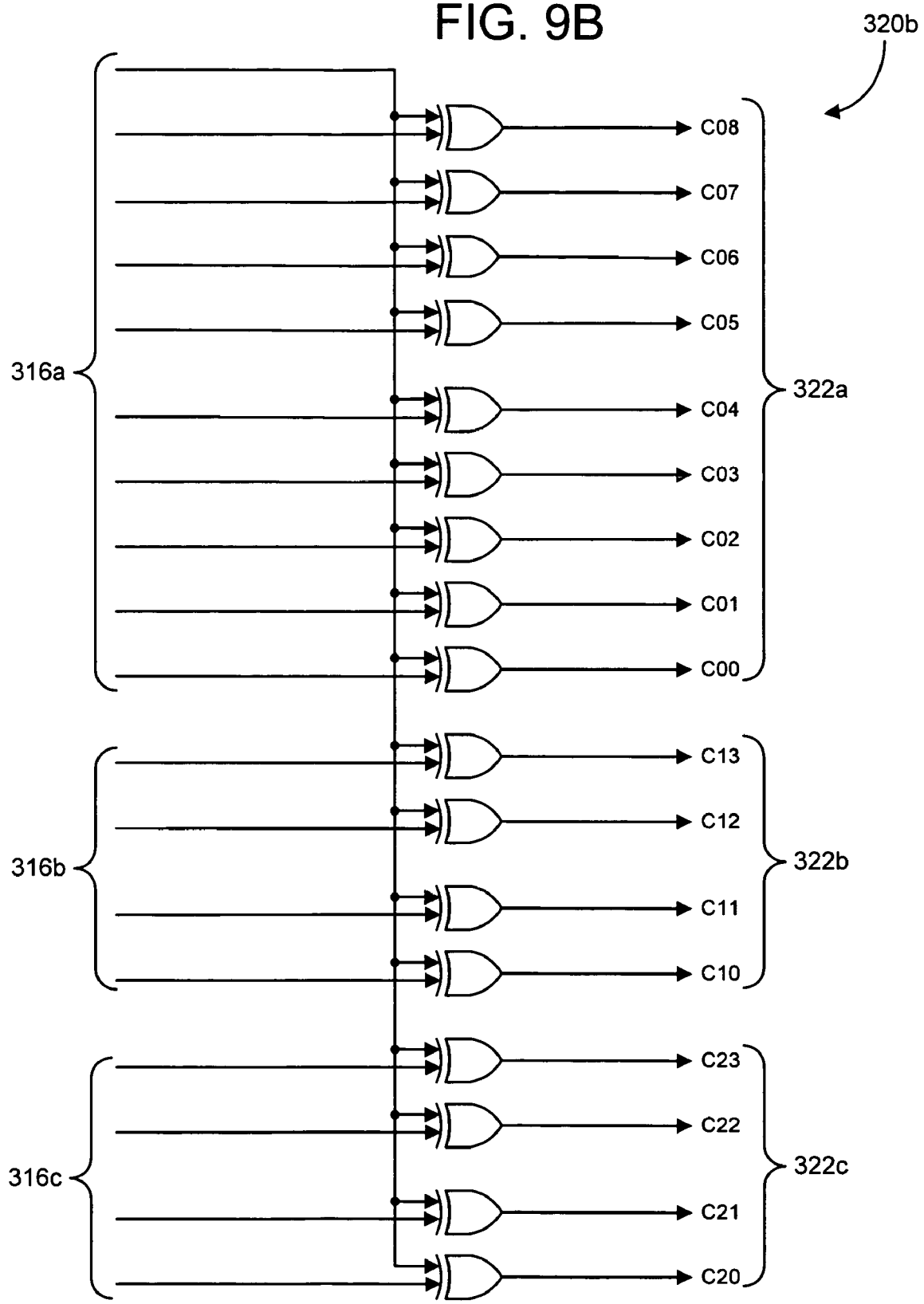
FIG. 9B is an exemplary logic diagram of the index reduction unit according to another version of the present invention.
Figure 9C:
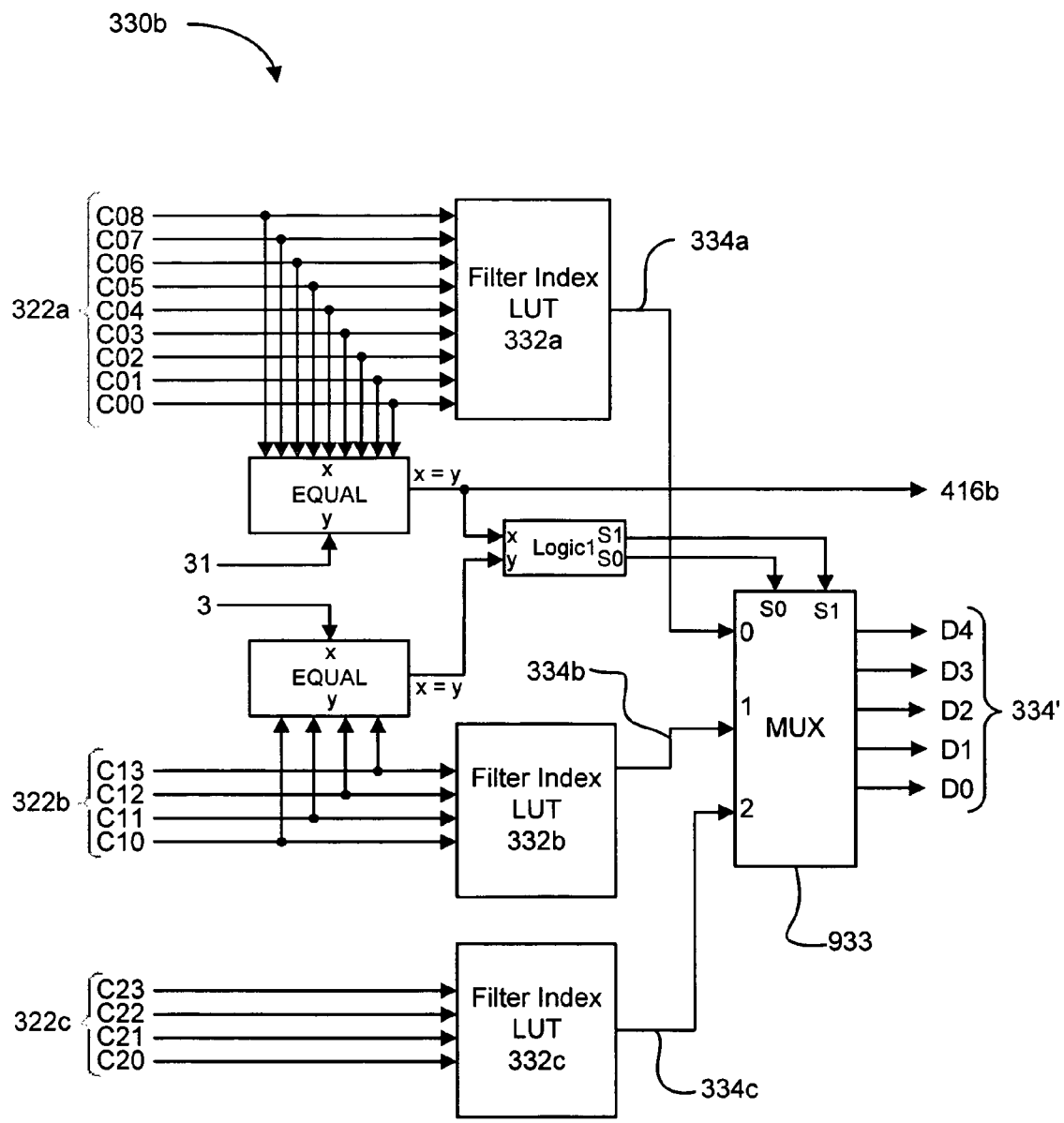
FIG. 9C is an exemplary logic diagram of the filter index selection unit another version of the present invention.

In this version, the classification module 300 generates a filter index 334 for each classification window 800a-800c, and one filter index 334 is selected and passed to the coefficient selection unit 410 in the interpolation module 400, as described below. FIG. 9A, FIG. 9B and FIG. 9C, collectively, illustrate an exemplary logic diagram of a version of the classification module 300b according to this version of the present invention. In particular, FIG. 9A is an exemplary logic diagram of the classification index unit 310b, FIG. 9B is an exemplary logic diagram of the index reduction unit 320b and FIG. 9C is an exemplary logic diagram of the filter index selection unit 330b. Referring first to FIG. 9A, the classification index unit 310b receives the pixel data 210 for each classification pixel 802 in each classification window 800a-800c. Each classification pixel 802 is compared to a weighted average 914 of all of the classification pixels 802. The most remote pixels 802, e.g., pixels O-R, are weighted less heavily than those pixels that are closer to the missing target pixel 110 (e.g., pixels A-N). The result of the comparison for the classification pixels 802 in each of the first 800a, second 800b and third 800c classification windows form first 316a, second 316b, and third 316c classification signals, respectively. The classification signals 316a-316c are passed to the index reduction unit 320b.

Referring now to FIG. 9B, the index reduction unit 320b reduces the first classification signal 316a by one bit by "XOR'ing" the first bit of the first classification signal 316a with each of the remaining bits of each classification signal 316a-316c. The index reduction unit 320b produces first 322a, second 322b, and third 322c classification indexes for each of the classification windows 800a-800c. Each classification index 322a-322c is passed to the filter index selection unit 330b.

Referring now to FIG. 9C, the filter index selection unit 330b preferably includes first 332a, second 332b and third 332c filter index LUT's that receive the first 322a, second 322b and third 322c classification indexes, respectively. The first filter index LUT 332*a* comprises 512 entries, and both the second 332*b* and third 332*c* filter index LUT's comprise 16 entries. Accordingly, the cumulative size of the three filter index LUT's 332*a*-332*c* is 544 entries. Notably, if only one filter index LUT 332 is indexed by the combined classification indexes 322*a*-322*c*, the LUT would comprise over 131,000 entries. Accordingly, by strategically grouping the classification pixels 802 and using more than one filter index LUT 332*a*-332*c*, the cumulative size of the LUT is significantly reduced.

Each of the filter indexes 334*a*-334*c* is inputted into a multiplexer 933. Determining which of the filter indexes 334*a*-334*c* is outputted by the multiplexer 933 is based on an analysis of the first 322*a* and second 322*b* classification indexes. In particular, the classification indexes 322*a*, 322*b* are analyzed to determine whether a horizontal edge is detected within the boundaries defined by the classification pixels 802 in the corresponding first 800*a* and second 800*b* classification windows. If a horizontal edge is not detected within the boundary defined by the first window 800*a* based on the first classification index 322*a*, i.e., first classification index 322*a*≠000011111b (31), then the first filter index 334*a* is selected. If a horizontal edge is detected within the first window 800*a*, but is not detected within the boundary defined by the second window 800*b* based on the first 322*a* and second 322*b* classification indexes, i.e., first classification index 322*a*=000011111b (31) and second classification index 322*b*≠0011b (3), the second filter index 334*b* will be selected. If a horizontal edge is detected in both the first 800*a* and second 800*b* window, i.e., first classification index 322*a*=000011111b (31) and second classification index 322*b*=0011b (3), then the third filter index 334*c* will be selected.

In this version, the first classification index 322*a* is also used to generate the interpolation window bit 416*b* based on whether a horizontal edge is detected in the first window 800*a*. If such an edge is not detected within the first window 800*a*, then the interpolation window bit 416*b* indicates that interpolation pixels in a narrow interpolation window can be used to calculate the value for the missing target pixel 110. The narrow interpolation window according to one version of the present invention is illustrated in FIG. 8B. As is shown, the narrow interpolation window 850*a* comprises a plurality of interpolation pixels 803 immediately surrounding the missing target pixel 110.

Alternatively, if a horizontal edge is detected in the first window 800*a* based on the first classification index 322*a*, the interpolation window bit 416*b* indicates that interpolation pixels in a wide interpolation window should be used. The wide interpolation window according to one version of the present invention is illustrated in FIG. 8C. As is shown, the wide interpolation window 850*b* comprises interpolation pixels 803 immediately above (pixel C) and below (pixel H) the missing target pixel 110, and the pixels in the first 800*a* and second 800*b* classification windows, i.e., pixels K-N and O-R.

Figure 10:
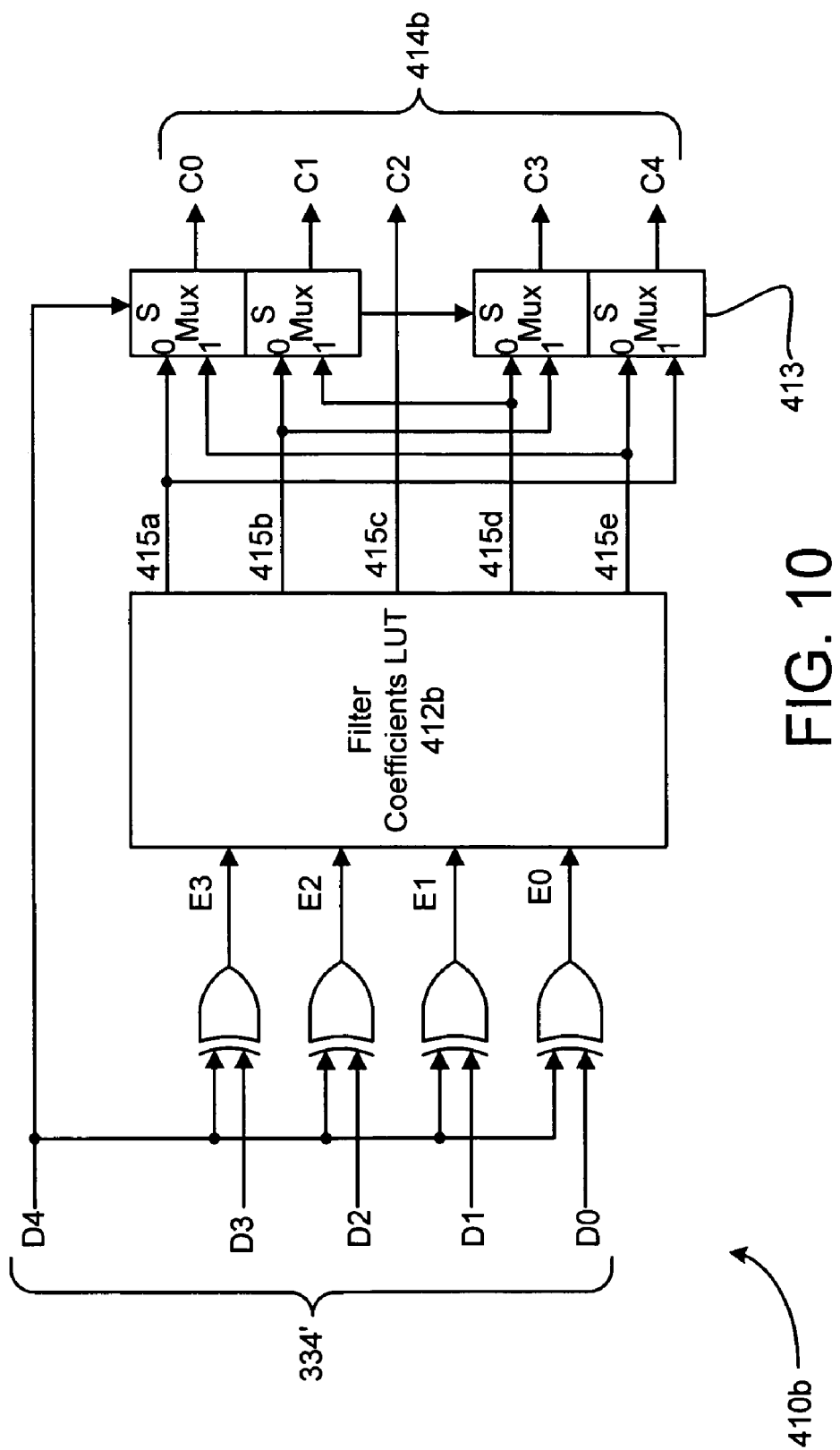
FIG. 10 is an exemplary logic diagram illustrating the coefficient selection unit according to another version of the present invention.

In this version, the interpolation window bit 416*b* and the selected filter index 334' are passed to the interpolation module 400. FIG. 10 is an exemplary logic diagram illustrating the coefficient selection unit 410*b* according to this version of the present invention. As is shown, the coefficient selection unit 410*b* comprises a filter coefficient LUT 412*b* that includes 16 entries corresponding to 32 available filter coefficient sets 414. Each set 414 includes five (5) filter coefficients, one for each interpolation pixel 803 and its companion.

The coefficient selection unit 410*b* functions in a manner similar to the coefficient selection unit 410*a* illustrated in FIG. 6 and described above. That is, a first filter coefficient 415*a* corresponding to an interpolation pixel 803, e.g., pixel A, and a second filter coefficient 415*e* corresponding to its mirror image pixel 803, e.g., pixel E, are inputs into the multiplexer 413. Similarly, all but the filter coefficient 415*c* corresponding to companion pixels C and H are paired with their respective mirror image filter coefficients and inputted into the multiplexer 413. The filter index 334' includes a mirror image bit, e.g., D4, and four filter index bits, D0-D3. The filter index bits, D0-D3, are "XOR'ed" with the mirror image bit, D4, and the resultant filter index bits, E0-E3, are inputted into the filter coefficients LUT 412*b*. The filter coefficient set 414 corresponding to the resultant filter index bits, E0-E3, is selected from the LUT 412*b*, and each filter coefficient 415*a*-415*e*, except 415*c*, and its mirror image is inputted into the multiplexer 413. The mirror image bit, D4, is inputted into each multiplexer 413 and determines which inputted filter coefficient, e.g., 415*a*, 415*e*, is outputted from the multiplexer 413. The filter coefficients, C0-C4, in the selected set (414*b*) are passed to the pixel value calculation unit 420, where they are used to calculate the value for the missing target pixel 110.

Figure 11:
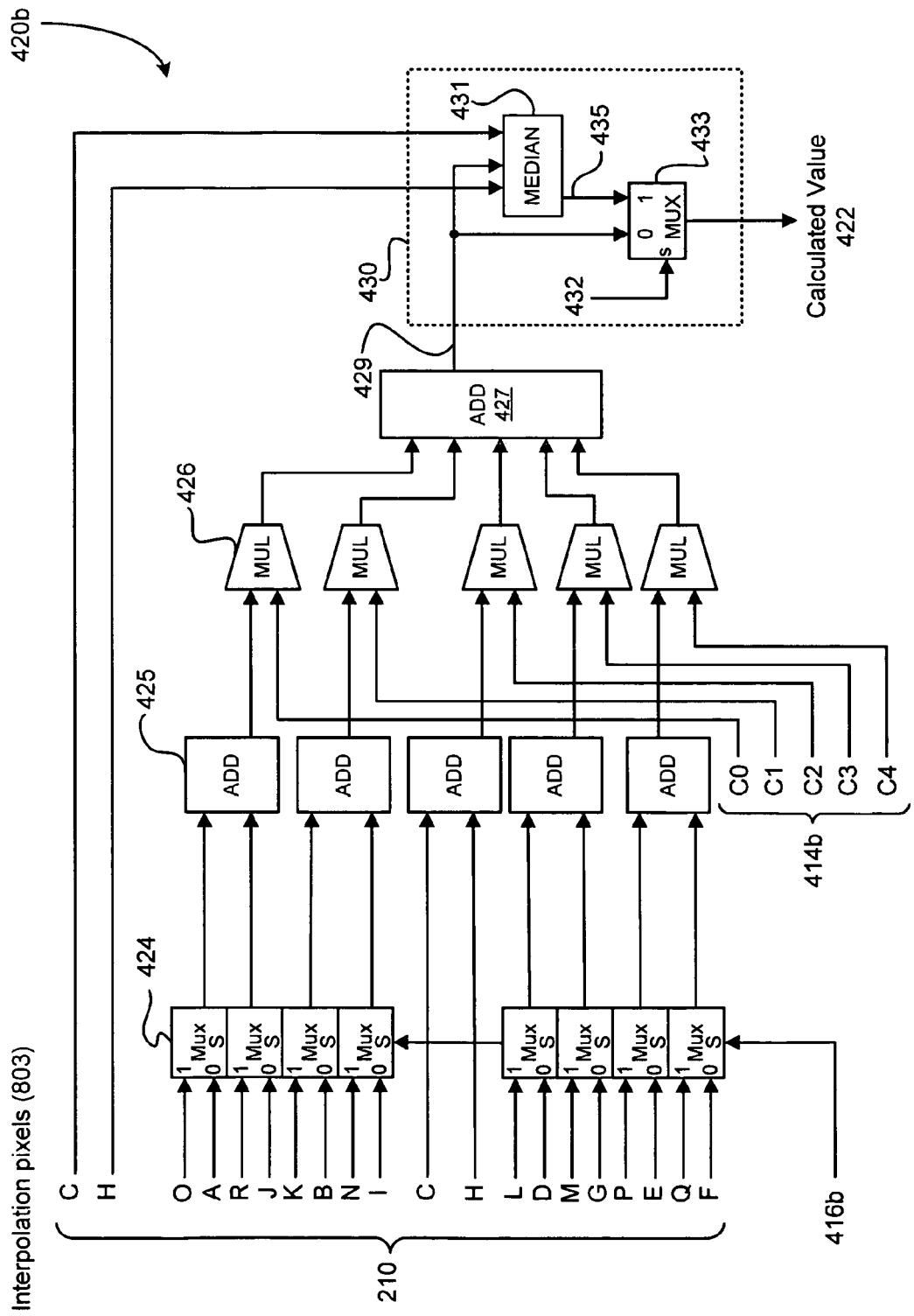
FIG. 11 is an exemplary logic diagram of the pixel value calculation unit according to another version of the present invention.

FIG. 11 is an exemplary logic diagram of the pixel value calculation unit 420*b* that receives the set of filter coefficients 414*b* from the filter coefficient selection unit 410*b* illustrated in FIG. 10 and the interpolation window bit 416*b* according to this version of the present invention. As is shown, the pixel value calculation unit 420*b* receives the pixel data 210 associated with each of the interpolation pixels 803 in each of the narrow 850*a* and wide 850*b* interpolation windows, i.e., pixels A-R. In an embodiment, the pixel data 210 comprises the "Y" signal (luminance value). In another embodiment, the pixel data 210 comprises the "Y" signal (luminance value) and the "Cb" and "Cr" signals (chrominance values). The interpolation window bit 416*b* is inputted as an address signal into at least one interpolation window multiplexer 424. In this version, if the interpolation window bit 416*b* has a bit value equal to one (1), the interpolation window multiplexer 424 outputs the pixel data 210 for interpolation pixels 803 in the wide interpolation window 850*b* (FIG. 8C). Alternatively, if the interpolation window bit 416*b* is equal to zero (0), the pixel data 210 for interpolation pixels 803 in the narrow interpolation window 850*a* (FIG. 8B) are outputted.

The pixel data 210 for each pair of companion interpolation pixels 803 is added by an adder 425 and the result is multiplied by a multiplier 426 with the corresponding filter coefficient, C0-C4, in the set 414*b*. The results from each multiplier 426 are added by another adder 427 and the output is the interpolated value 429 for the missing target pixel 110. The interpolated value 429 can be outputted directly from the pixel value calculation unit 420 as the calculated value 422, or passed into a median filter unit 430, as described above, and the median value 435 is outputted.

In another version of the present invention, interpolation pixels 803 in a ring interpolation window 850*c*, illustrated in FIG. 8D, are used to calculate the value for the missing target pixel 110. In this version, it is no longer assumed that companion pixels, i.e., a pair of interpolation pixels 803 arranged symmetrically around the missing target pixel 110, share the same interpolation filter coefficient. Namely, it is no longer assumed that recognizable patterns are symmetrical around the missing target pixel 110, thus more general patterns can be recognized and handled by the pixel interpolation module 200. In a preferred embodiment, the number of interpolation pixels 803 is reduced and therefore fewer pixels 803 are buffered, and each interpolation pixel 803 is associated with a filter coefficient, as opposed to pairing companion pixels and associating the pair with a filter coefficient. Accordingly, fewer interpolation pixels 803 can be utilized without compromising the quality of the calculated value for the missing target pixel 110.

Figure 12:
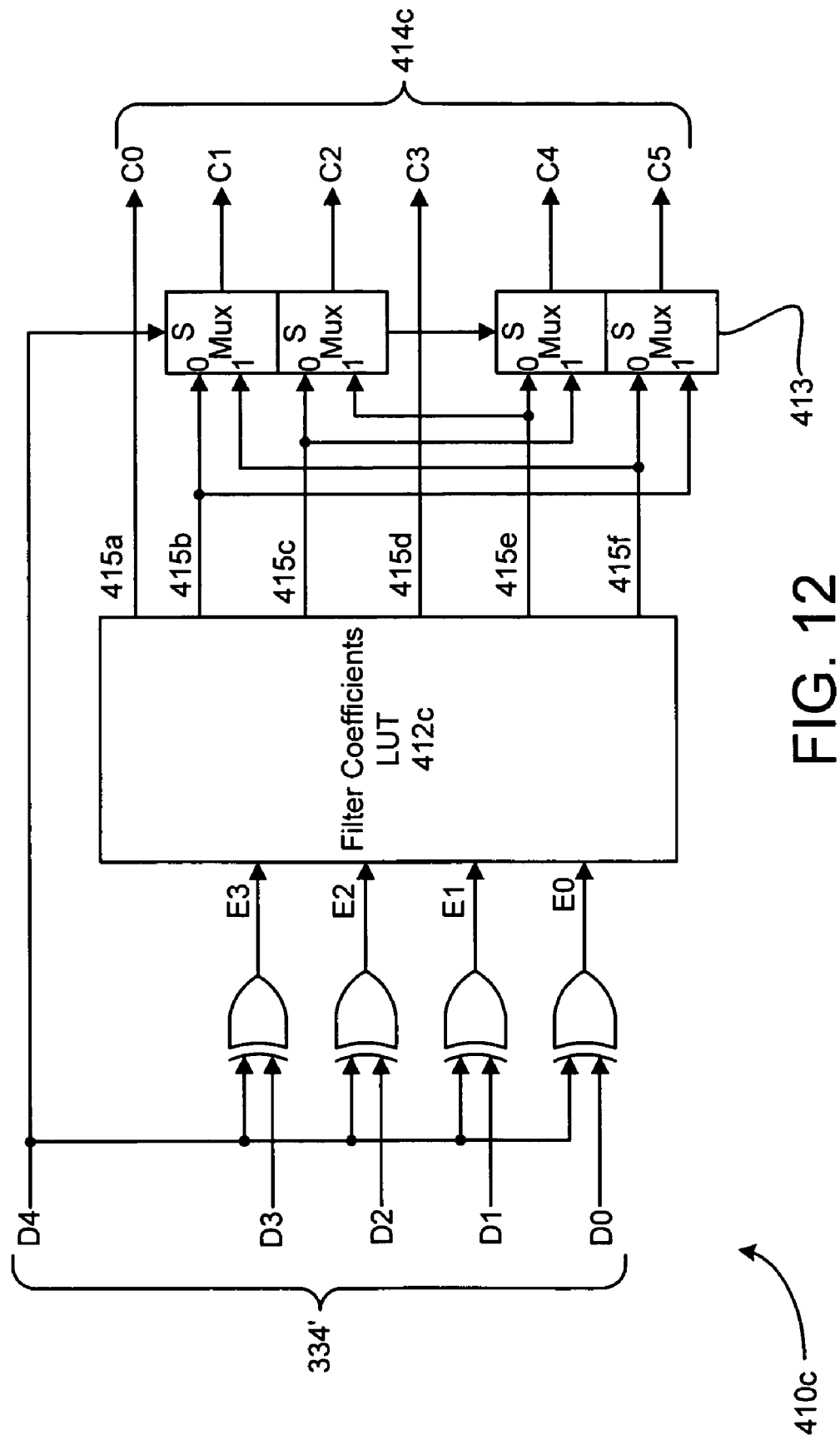
FIG. 12 is an exemplary logic diagram of the coefficient selection unit according to another version of the present invention.

In this version, the coefficient selection unit 410 preferably receives the filter index 334' outputted from the filter index selection unit 330b illustrated in FIG. 9C and described above. FIG. 12 is an exemplary logic diagram of the coefficient selection unit 410c according to this version of the present invention. As is shown, the coefficient selection unit 410c comprises a filter coefficient LUT 412c that includes 16 entries corresponding to 32 available filter coefficient sets 414. Each set 414 includes six (6) filter coefficients, C0-C5 (415a-415f), one for each interpolation pixel 803 in the ring interpolation window 850c.

The coefficient selection unit 410c functions in a manner similar to the coefficient selection unit 410b illustrated in FIG. 10 and described above, except that the first filter coefficient, C0 (415a), and fourth filter coefficient, C3 (415d), are not inputted into a multiplexer 413. These filter coefficients 415a, 415d correspond to interpolation pixels H and C, which are directly above and below, respectively, the missing target pixel 110. The other filter coefficients, e.g., 415b, 415c, 415e, 415f are paired with their respective mirror images and inputted into a multiplexer 413. For example, the second filter coefficient 415b corresponding to interpolation pixel G (803) is paired with the sixth filter coefficient 415e corresponding to interpolation pixel I (803), which is the mirror image of pixel G (803).

As described above, the filter index 334' includes a mirror image bit, e.g., D4, and four filter index bits, D0-D3. The filter index bits, D0-D3, are "XOR'ed" with the mirror image bit, D4, and the resultant filter index bits, E0-E3, are inputted into the filter coefficients LUT 412c. The filter coefficient set 414 corresponding to the resultant filter index bits, E0-E3, is selected from the LUT 412c. The mirror image bit, D4, is inputted into each multiplexer 413 and determines which inputted filter coefficient, e.g., 415b, 415f, is outputted from the multiplexer 413. The filter coefficients, C0-C5, in the selected set (414c) are passed to the pixel value calculation unit 420, where they are used to calculate the value for the missing target pixel 110.

FIG. 13 is an exemplary logic diagram of the pixel value calculation unit 420c that receives the set of filter coefficients 414c from the filter coefficient selection unit 410c illustrated in FIG. 12 according to this version of the present invention. As is shown, the pixel value calculation unit 420b receives the pixel data 210 associated with each of the interpolation pixels 803 in the ring interpolation window 800c, i.e., pixels B-D and G-I. In an embodiment, the pixel data 210 comprises the "Y" signal (luminance value). In another embodiment, the pixel data 210 comprises the "Y" signal (luminance value) and the "Cb" and "Cr" signals (chrominance values). The pixel data 210 for each pixel 803 is multiplied by a multiplier 426 with the corresponding filter coefficient, $C_0$-$C_5$, in the set 414c. The results from each multiplier 426 are added by an adder 427 and the output is the interpolated value 429 for the missing target pixel 110. The interpolated value 429 can be outputted directly from the pixel value calculation unit 420 as the calculated value 422, or passed into a median filter unit 430, as described above, and the median value 435 is outputted.

According to each of the versions described above, the pixel interpolation module 200 uses simple logic circuits that do not require complex computational resources and relatively small lookup tables 332, 412 that do not require large amounts of memory to produce a high quality enhanced image substantially without jaggy edges. As is described above, by exploiting the symmetry properties of the classification window and using multiple lookup tables 332, 412 to determine the appropriate set of filter coefficients 414, the size of the lookup tables 332, 412 and the associated hardware costs can be substantially reduced.

In one version, entries in the lookup tables 332, 412 can be pre-determined based on empirical data. In another version, the entries can be pre-determined during a configuration or training process using known training images as input.

FIG. 14 is a flowchart illustrating a training process according to this version of the present invention. The training process begins by initializing the filter coefficients LUT 412 (step 500). Initializing these values is done by using heuristic methods or according to empirical data and is well know by those skilled in the art. For example, filter coefficients generated randomly or by some common filter design methods, after suitable normalization, can be used as the initial values of the filter coefficients LUT 412.

Once the initial filter coefficient values have been entered, pixel data 210 from known standard definition (SD) training images are inputted into the pixel interpolation module 200 (step 502). In one version, the training images can be from known high definition (HD) images that are converted into pixel data 210 in SD format. Accordingly, the output video signal 250 generated by the pixel interpolation module 200 corresponding to the SD training images can be directly compared to the pixel data of the HD images as reference to determine its accuracy. Moreover, the SD training images are preferably ones that depict a variety of fine details and complicated textures.

Next, the pixel interpolation module 200 continues the training process by analyzing the pixel data 210 from the SD training images. In particular, for every missing target pixel 110 in an SD image, the classification module 300 generates and stores the bit values of the classification index 322 associated with the missing target pixel 110 (step 504). The bit values preferably include all bits corresponding to the one or more classification windows 400, 800a-800c.

Simultaneously or subsequently, the interpolation module 400 calculates and stores interpolation values for the missing target pixel 110 using each set of the filter coefficients in the filter coefficients LUT 412 (step 506). The calculated interpolation values for each missing target pixel 110 are compared to the reference values derived from the HD images and an error measure is calculated for each interpolation value (step 508). Commonly used error measures such as squared error or absolute error are suited for this purpose and well known by those skilled in the art. Steps 504 to 508 should be repeated for all the missing target pixels of all the SD training images.

Thus, for example, if the classification index 322 comprises M bits for each missing pixel in each SD training image, then there are $2^M$ possible combinations of bit values of classification index 322 such that: {CL(i)=i; where $0 \leq i \leq 2^M-1$}. Let there be K sets of filter coefficients that can be selected to be the optimal set of filter coefficients for each bit value of classification index 322. After the pixel interpolation module 200 completes analyzing the pixel data 210 for all of the missing pixels 104 in all SD training images, for each bit value of classification index CL(i), there are R(i) occurrences throughout the SD training images, where $\Sigma_i$ R(i)=total number of missing pixels 104 in all SD training images. For each of the R(i) occurrences of CL(i), i.e., $1 \leq r \leq R(i)$, there are K stored interpolation values $\{D(i, r, k); 1 \leq k \leq K\}$ for the missing target pixel 110 using each of the K sets of filter coefficients and K stored error measures, together with the corresponding correct value $H_1(i, r)$ derived from the HD images.

Based on the stored error measures, the optimal set of filter coefficients is determined for each bit value of classification index CL(i) as the one generating the interpolation values with the least total error (TE) for all the missing pixels 104 in all SD training images that possess the same bit value of classification index 322 (step 510). Note that for those bit values of classification index 322 that have no occurrence throughout the SD training images, a predetermined optimal set of filter coefficients, such as that for a vertical interpolation, is assigned. A filter index associated with the optimal set of filter coefficients is then entered into at least one filter index LUT 332 (step 512).

In one version, the value $LUT_1(i)$ in the filter index LUT 332 associated with the bit value i of classification index 322 is the filter index $f_{opt}$ of the optimal set of filter coefficients generating the interpolation values with the least total error $TE_1(i, f_{opt})$ among all K set of filter coefficients. That is:

$LUT_1(i) = f_{opt}$ where $TE_1(i, f_{opt}) \leq TE_1(i, f)$ for all $1 \leq f \leq K$ and $f \neq f_{opt}$, and $TE_1(i, f) = \Sigma_r [D(i, r, f) - H_1(i, r)]^2$.

Once the values in the filter index LUT 332 have been entered, the training process continues by calculating the updated values of filter coefficients to achieve least total error for each set of filter coefficients (step 514). The goal for this filter coefficients update is to achieve least total errors (TE) for all the missing target pixels 110 through out the SD training images that are assigned to the same set of filter coefficients by the filter index LUT 332. In one version, the set of values $LUT_2(k)$ in the filter coefficients LUT 412 associated with the bit value k of filter index 334 is the optimal set of filter coefficients $w_{opt}$ that indicate the weight for each of the interpolation pixels 403, 803 in the interpolation windows 450a, 450b, 850a-850c for calculating the optimal interpolation value for the $k^{th}$ set of filter coefficients.

Let there be N filter coefficients in each set of filter coefficients. Suppose there are U(k) occurrences of missing pixels 104 throughout the SD training images that are assigned to the $k^{th}$ set of filter coefficients by the filter index LUT 332, where $\Sigma_k U(k)$=total number of missing pixels 104 in all SD training images. For each of the U(k) occurrences of the $k^{th}$ set of filter coefficients, i.e., $1 \leq u \leq U(k)$, there are N stored interpolation pixel values $\{E(k, u, n); 1 \leq n \leq N\}$ for the missing target pixel 110, together with the corresponding correct value $H_2(k, u)$ derived from the HD images. The optimal set of filter coefficients $w_{opt}$ produces the interpolation values with the least total error $TE_2(k, w_{opt})$ among all possible sets of filter coefficients. That is:

$LUT_2(k) = w_{opt} = [w_{opt1} \ w_{opt2} \ldots w_{optN}]$ where $TE_2(k, w_{opt}) \leq TE_2(k, w)$ for all $w = [w_1 \ w_2 \ldots w_N] \neq w_{opt}$, and $TE_2(k, w) = \Sigma_u \{[\Sigma_n E(k, u, n) \times w_n] - H_2(k, u)\}^2$.

If N<<U(k) for each k, which is almost always the case, the optimal set of filter coefficients $w_{opt}$ for each of the K sets of filter coefficients can be obtained by calculating analytically or numerically the least-square solution of an over-determined system of equations. Although squared error is used for the definition of the total error measure $TE_2$, other definitions of $TE_2$ are known in the art and are also applicable.

Referring again to FIG. 14, after the optimal filter coefficients have been calculated (step 514) and the filter coefficients LUT 412 has been updated with the new values (step 516), it is to be determined whether to repeat the training process (step 518). This determination can be based on one or more factors, such as whether the training process has been performed a predetermined number of times. It can also be determined by comparing the difference between updated filter coefficient values and previous ones, and if the difference is less than a predetermined value, then the filter coefficient values are optimized. Hence, the training process need not be repeated.

If the training process repeats, steps 502 to 518 are repeated. Otherwise, the training process terminates (step 520). At this point, the filter coefficient values in the filter coefficient LUT 412 are set and the filter index in the filter index LUT 332 are determined. The pixel interpolation module 200 can then utilize the filter index LUT 332 and filter coefficient LUT 412 to calculate an interpolation value for a missing target pixel 110 according to the bit value of its associated classification index 322.

According to the versions of the present invention, the pixel interpolation module 200 classifies each missing target pixel 110 according to the pixels 402, 802 in one or more surrounding classification windows 400, 800a-800c to generate a classification index 322 for each classification window 400, 800a-800c. A filter index 334 is selected from the filter index LUT 332 based on the classification index 322, and the appropriate set of filter coefficients 414 is selected from the filter coefficients LUT 412 according to the filter index 334. The set of filter coefficients 414 is then used to interpolate among pixels in the appropriate interpolation window 450a, 450b, 850a-850c to calculate the value for the missing target pixel 110. Because the pixel interpolation module 200 uses simple logic circuits to perform simple calculations and the LUT's 332, 412 are small, the hardware resources required to perform the interpolation process are minimal. Moreover, the time required to generate the value for the missing target pixels 110 is also minimal compared to the time required by conventional methods that are more complex and calculation intensive.

The pixel interpolation module 200 can be incorporated into any display system that performs image signal processing, such as an image capture device, printer, or television display system. For example, the pixel interpolation module 200 can be integrated with a de-interlacer in a television display system, where the de-interlacer converts an interlaced video signal into a progressive scanned video signal which is displayed to a viewer.

FIG. 15 depicts an exemplary display system according to a version of the present invention. As is shown the display system 20 includes a signal receiving unit 22 that is coupled to a tuner box 24, and a video decoder 28. Signals 21, such as television signals, are captured by the signal receiving unit 22 and transmitted to the tuner box 24. The tuner box 24 includes a converter 25 and a demodulation unit 26 that transforms the incoming signal into an analog signal. The analog signal 27 is received by the video decoder 28, which outputs an interlaced video signal 29. The de-interlacer 30 converts the interlaced video signal 29 into a progressive video output signal 32. The progressive video output signal 32 is then displayed via an LCD or PDP 34. In a preferred embodiment, the de-interlacer 30 is that described in co-pending U.S. application Ser. No. 11/019,017, filed Dec. 20, 2004 and entitled "METHOD AND APPARATUS FOR PER-PIXEL MOTION ADAPTIVE DE-INTERLACING OF INTERLACED VIDEO FIELDS," the entirety of which is herein incorporated by reference. In this system, the pixel interpolation module 200 is particularly effective because of its fast processing rate and low cost.

FIG. 16 is a schematic block diagram of a de-interlacer 30 that uses the pixel interpolation module 200 according to one version of the present invention. The de-interlacer 30 comprises a motion detection unit 40 and a video processing unit 50. The motion detection unit 40 processes pixel data 210 in a plurality of image frames 100 and calculates motion data 42 related to a missing target pixel 110 in an interlaced image frame 100 for which a value must be determined in order to generate the corresponding progressively scanned video signal 70. The video processing unit 50 includes at least one look up table 52 that references a plurality of de-interlacing modules 60, one of which is the pixel interpolation module 200. The de-interlacing methods 60 can include those that are based on field merging and those that are based on pixel interpolation, or a combination thereof. Depending in part on the motion data 42 for the missing target pixel 110, the video processing unit 50 utilizes the lookup table(s) 52 to select at least one de-interlacing module 60 to generate a value for the missing target pixel 110. The outputted video signal 70 includes the missing target pixels 110 interspersed between the existing pixels 102 in each image frame 100.

The present invention has been described with reference to certain preferred versions. Nevertheless, other versions are possible. For example, the number of classification pixels and classification windows used to classify the missing target pixel can vary and other interpolation windows can be utilized. In addition, more or fewer filter coefficient sets can be utilized. Further, alternative steps equivalent to those described for the image enhancement and training processes can also be used in accordance with the parameters of the described implementations, as would be apparent to one of ordinary skill. Therefore, the spirit and scope of the appended claims should not be limited to the description of the preferred versions contained herein.

What is claimed is:

1. A method for determining a value for a missing target pixel in an image frame, the method comprising:
    (a) generating a classification index from a plurality of classification pixels in a classification window associated with the missing target pixel, wherein the classification index indicates whether a recognizable pattern is detected in the classification window;
    (b) utilizing the classification index to select a filter index from a plurality of filter indexes via a lookup table associated with the classification index;
    (c) utilizing the selected filter index to select a set of filter coefficients from a plurality of sets via a lookup table associated with the filter index; and
    (d) calculating the value for the missing target pixel using the selected set of filter coefficients.

2. A method according to claim 1 further comprising:
    (e) prior to (a), defining at least one classification window comprising a plurality of classification pixels directly above and below the missing target pixel and in scan lines immediately preceding and immediately following a scan line including the missing target pixel, wherein the classification pixels are arranged symmetrically around the missing target pixel.

3. A method according to claim 2 wherein (a) includes:
    (i) generating a classification signal comprising a plurality of bits, wherein each bit relates to an attribute associated with the plurality of classification pixels in the classification window; and
    (ii) reducing the number of bits of the classification signal based on symmetry properties of the classification pixels and forming the classification index, wherein a number of entries in the lookup table associated with the classification index is reduced by a factor of two for every bit reduced from the classification signal.

4. A method according to claim 3 wherein generating the classification signal comprises comparing each classification pixel to a weighted average of all of the classification pixels, and generating a bit value based on the comparison for each classification pixel.

5. A method according to claim 1 wherein (d) further comprises:
    (i) defining at least two interpolation windows, each window comprising a plurality of interpolation pixels arranged symmetrically around the missing target pixel;
    (ii) selecting an interpolation window based on whether a recognizable pattern is detected in the classification window; and
    (iii) using the interpolation pixels in the selected interpolation window and the selected set of filter coefficients to calculate the value for the missing target pixel.

6. A method according to claim 5 further comprising:
    (e) reducing a size of the lookup table associated with the filter index by halving a number of filter coefficients in each set and halving a number of table entries in the lookup table based on symmetry properties of the interpolation pixels.

7. A method according to claim 1 further comprising:
    (e) prior to (a), defining a classification window comprising five (5) classification pixels directly above and five (5) classification pixels directly below the missing target pixel and in scan lines immediately preceding and immediately following a scan line including the missing target pixel, wherein the classification pixels above and below the missing target pixel are arranged symmetrically around the missing target pixel.

8. A method according to claim 7 wherein (d) comprises:
    (i) defining a first interpolation window comprising a plurality of interpolation pixels that are the classification pixels in the classification window, and defining a second interpolation window comprising a plurality of interpolation pixels that include a pixel directly above and directly below the missing target pixel and in scan lines immediately preceding and immediately following the scan lines including the classification pixels;
    (ii) selecting the first interpolation window if a recognizable pattern is detected in the classification window;
    (iii) selecting the second interpolation window if a recognizable pattern is not detected in the classification window; and
    (iv) using the interpolation pixels in the selected interpolation window and the selected set of filter coefficients to calculate the value for the missing target pixel.

9. A method according to claim 1 further comprising:
    (e) prior to (a), defining a first classification window comprising five (5) classification pixels directly above and five (5) classification pixels directly below the missing target pixel and in scan lines immediately preceding and immediately following a scan line including the missing target pixel and arranged symmetrically around the missing target pixel, defining a second classification window comprising four (4) classification pixels, wherein each of the four (4) classification pixels is located adjacent to an outermost classification pixel in the first window and in the same scan line, and a third classification window comprising four (4) classification pixels, wherein each of the four (4) classification pixels is located adjacent to the four (4) classification pixels in the second window and in the same scan line, such that the third classification window is wider than the second classification window, which is wider than the first classification window.

10. A method according to claim 9 wherein (d) comprises:
(i) defining a first interpolation window comprising a plurality of interpolation pixels that are the classification pixels in the first classification window, and defining a second interpolation window comprising a plurality of interpolation pixels that include the classification pixels in the second and third classification windows and a pixel directly above and a pixel directly below the missing target pixel and in scan lines immediately preceding and immediately following the scan line including the missing target pixel;
(ii) selecting the first interpolation window if a horizontal edge is not detected in the first classification window;
(iii) selecting the second interpolation window if a horizontal edge is detected in the first classification window; and
(iv) using the interpolation pixels in the selected interpolation window and the selected set of filter coefficients to calculate the value for the missing target pixel.

11. A method according to claim 9 wherein (d) comprises:
(i) defining an interpolation window comprising three (3) interpolation pixels directly above and three (3) interpolation pixels directly below the missing target pixel and in scan lines immediately preceding and immediately following the scan line including the missing target pixel, wherein the interpolation pixels above and below the missing target pixel are arranged symmetrically around the missing target pixel; and
(ii) using the interpolation pixels in the interpolation window and the selected set of filter coefficients to calculate the value for the missing target pixel.

12. A method according to claim 9 wherein (a) further includes:
(i) generating a first, a second and a third classification index for the first, the second and the third classification window, respectively.

13. A method according to claim 12 wherein (b) further includes:
(i) using the first classification index to select a first filter index via a lookup table associated with the first classification index;
(ii) using the second classification index to select a second filter index via a lookup table associated with the second classification index;
(iii) using the third classification index to select a third filter index via a lookup table associated with the third classification index; and
(iv) selecting one of the first, the second, or the third filter indexes based on whether a horizontal edge is detected in either of the first or the second classification windows.

14. A method according to claim 1 further comprising:
(e) prior to (a), providing values in the lookup tables associated with the filter index and with the classification index by performing a training process, wherein the training process comprises:
(i) providing a plurality of entries in the lookup table associated with the filter index, wherein each entry comprises a set of filter coefficients;
(ii) providing a plurality of known standard definition training images, wherein the training images are derived from known high definition images;
(iii) for each missing target pixel in each of the training images, generating and storing a classification index associated with each missing target pixel;
(iv) for each missing target pixel in each of the training images, calculating and storing an interpolation value for each missing target pixel using each set of filter coefficients in the lookup table associated with the filter index;
(v) comparing the interpolation value for each missing target pixel to the corresponding known high definition image pixel value to determine an error measure between the interpolation value and the known high definition value;
(vi) selecting the set of filter coefficients that produces the least total error for all the missing target pixels in each training image that have the same classification index;
(vii) associating a filter index with the selected set of filter coefficients;
(viii) correlating the filter index with the corresponding classification index in the lookup table associated with the classification index;
(ix) adjusting and updating the sets of filter coefficients to minimize the total error;
(x) determining whether to repeat the training process; and
(xi) if the training process is to be repeated, repeating steps (i) through (x).

15. A pixel interpolation module for determining a value for a missing target pixel in an image frame, the module comprising:
means for receiving and buffering pixel data associated with pixels in a plurality of scan lines in the image frame;
means for generating a classification index from a plurality of classification pixels in a classification window associated with the missing target pixel, wherein the classification index indicates whether a recognizable pattern is detected in the classification window;
a filter index selection unit that includes at least one filter index lookup table, wherein the filter index selection unit uses the classification index to perform a lookup in a filter index lookup table to select a filter index from a plurality of filter indexes;
a filter coefficient selection unit that includes at least one filter coefficient lookup table, wherein the selection unit uses the selected filter index to perform a lookup in a filter coefficient lookup table to select a set of filter coefficients from a plurality of sets; and
a pixel value calculation unit comprising circuitry for calculating the value for the missing target pixel using the selected set of filter coefficients.

16. A pixel interpolation module according to claim 15 wherein the classification window comprises a plurality of classification pixels directly above and below the missing target pixel and in scan lines immediately preceding and immediately following a scan line including the missing target pixel, wherein the classification pixels are arranged symmetrically around the missing target pixel.

17. A pixel interpolation module according to claim 16 wherein the means for generating a classification index includes:
a classification unit for generating a classification signal comprising a plurality of bits, wherein each bit relates to an attribute associated with the plurality of classification pixels in the classification window; and;

an index reduction unit comprising circuitry for reducing the number of bits of the classification signal based on symmetry properties of the classification pixels and for forming the classification index, wherein a number of entries in each filter index lookup table is reduced by a factor of two for every bit reduced from the classification signal.

18. A pixel interpolation module according to claim 17 wherein the classification unit comprises a plurality of comparator circuits for comparing each classification pixel to a weighted average of all of the classification pixels, each comparator circuit outputting a bit value based on the comparison of each classification pixel.

19. A pixel interpolation module according to claim 17 wherein the circuitry in the reduction unit comprises a plurality of XOR circuit gates associated with each of the comparator circuits in the classification unit except a first comparator circuit, each XOR gate including two inputs, wherein the first input is the bit value outputted from the first comparator circuit and the second input is the bit value outputted from the associated comparator circuit, wherein the classification index comprises the output of each XOR gate.

20. A pixel interpolation module according to claim 15 further comprising means for defining at least two interpolation windows, each window comprising a plurality of interpolation pixels arranged symmetrically around the missing target pixel, and wherein the pixel value calculation unit comprises circuitry to select an interpolation window based on whether a recognizable pattern is detected in the classification window and to calculate the value for the missing target pixel using the interpolation pixels in the selected interpolation window and the selected set of filter coefficients.

21. A pixel interpolation module according to claim 20, wherein a size of each filter coefficient lookup table is reduced by halving a number of filter coefficients in each set and halving a number of table entries in the lookup table based on symmetry properties of the interpolation pixels.

22. A pixel interpolation module according to claim 15 wherein the pixel value calculation unit comprises a median filter unit that outputs the median value between the calculated value for the missing target pixel, and the pixel values for a pixel directly above and a pixel directly below the missing target pixel in scan lines immediately preceding and immediately following the scan line including the missing target pixel.

23. A de-interlacing unit for converting interlaced video fields into a progressive video signal, the de-interlacing unit comprising:

means for receiving and buffering pixel data associated with pixels in a plurality of scan lines in the interlaced frame;

a motion detection unit for receiving the pixel data from the buffering means and for calculating motion data related to a missing target pixel in the interlaced frame;

a video processing unit coupled to the motion detection unit, the video processing unit including a pixel interpolation module comprising:

means for generating a classification index from a plurality of classification pixels in a classification window associated with the missing target pixel, wherein the classification index indicates whether a recognizable pattern is detected in the classification window;

a filter index selection unit that includes at least one filter index lookup table, wherein the filter index selection unit uses the classification index to perform a lookup in a filter index lookup table to select a filter index from a plurality of filter indexes;

a filter coefficient selection unit that includes at least one filter coefficient lookup table, wherein the selection unit uses the selected filter index to perform a lookup in a filter coefficient lookup table to select a set of filter coefficients from a plurality of sets; and a pixel value calculation unit comprising circuitry for calculating the value for the missing target pixel using the selected set of filter coefficients; and means for outputting the value for the missing target pixel in a scan line between interlaced scan lines.

24. A progressive scan display system comprising:

a signal receiving unit;

a tuner box for transforming the signal into an analog signal;

a video decoder for transforming the analog signal into a plurality of interlaced video fields;

a de-interlacing system for converting the interlaced video fields into a progressive video signal, the de-interlacing system comprising:

a motion detection unit for generating motion data related to a missing target pixel in a subject interlaced video field;

a video processing unit for receiving the motion data and for selecting and utilizing at least one of a plurality of de-interlacing modules to determine a value for the missing target pixel based on the motion data related to the missing target pixel, one of the de-interlacing modules being a pixel interpolation module comprising:

means for generating a classification index from a plurality of classification pixels in a classification window associated with the missing target pixel, wherein the classification index indicates whether a recognizable pattern is detected in the classification window;

a filter index selection unit that includes at least one filter index lookup table, wherein the filter index selection unit uses the classification index to perform a lookup in a filter index lookup table to select a filter index from a plurality of filter indexes;

a filter coefficient selection unit that includes at least one filter coefficient lookup table, wherein the selection unit uses the selected filter index to perform a lookup in a filter coefficient lookup table to select a set of filter coefficients from a plurality of sets; and a pixel value calculation unit comprising circuitry for calculating the value for the missing target pixel using the selected set of filter coefficients; and a display for displaying the progressive video signal.

* * * * *